(12) United States Patent
Santos et al.

(10) Patent No.: US 9,157,772 B2
(45) Date of Patent: Oct. 13, 2015

(54) SENSING ASSEMBLY COMPONENTS AND METHODS OF ASSEMBLING, MOUNTING AND ORIENTATING SAME

(75) Inventors: Roberto S. Santos, Hudson, MA (US); Diana A. Sufariu, Nashua, NH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 766 days.

(21) Appl. No.: 13/315,992

(22) Filed: Dec. 9, 2011

(65) Prior Publication Data

US 2012/0167700 A1 Jul. 5, 2012

Related U.S. Application Data

(60) Provisional application No. 61/428,921, filed on Dec. 31, 2010.

(51) Int. Cl.
*G01D 21/00* (2006.01)
*G01D 11/24* (2006.01)

(52) U.S. Cl.
CPC ......... *G01D 11/245* (2013.01); *Y10T 29/49826* (2015.01)

(58) Field of Classification Search
CPC . Y10T 29/49826; G01D 11/30; G01D 11/245
USPC .......................................... 73/866.5; 29/428
See application file for complete search history.

(56) References Cited

U.S. PATENT DOCUMENTS

| | | | |
|---|---|---|---|
| 4,468,814 A | 8/1984 | Field | |
| 4,785,240 A | 11/1988 | Newell et al. | |
| 5,239,130 A | 8/1993 | Brasse | |

(Continued)

FOREIGN PATENT DOCUMENTS

| | | |
|---|---|---|
| DE | 920919 | 12/1954 |
| DE | 3918874 A1 | 12/1990 |

(Continued)

OTHER PUBLICATIONS

Efector 100—Alignment of the Sensing Face; IFM Electronic catalog page; Feb. 2007.

(Continued)

*Primary Examiner* — Peter Macchiarolo
*Assistant Examiner* — Mohammed Keramet-Amircola
(74) *Attorney, Agent, or Firm* — Whyte Hirschboeck Dudek S.C.

(57) ABSTRACT

A variety of sensing assembly components, and methods of assembling, mounting, and orientating such assemblies and/or components, are disclosed. In one example embodiment, a sensing assembly includes a main body including at least a housing portion, and a mounting portion protruding outward from the main body. The mounting portion includes an outer connector section including at least one electrical connector, and an intermediate section that includes an outer surface that either has substantially a shape of a polygon or is at least partly threaded, where the intermediate section is positioned in between the main body and the outer connector section. Additionally, the intermediate section has an outer diameter, the outer connector section has an outer diameter, and the intermediate section outer diameter is greater than the outer connection section outer diameter. In other example embodiments, retaining structures on portions of a sensing assembly, or bracket assembly components, are provided.

31 Claims, 7 Drawing Sheets

(56) References Cited

U.S. PATENT DOCUMENTS

| | | | |
|---|---|---|---|
| 5,543,782 | A | 8/1996 | Rothbaum et al. |
| 5,698,975 | A | 12/1997 | Kayserman |
| D391,182 | S | 2/1998 | Schneider et al. |
| 5,924,880 | A | 7/1999 | Watanabe et al. |
| 6,655,986 | B2 | 12/2003 | Kroll |
| 7,063,537 | B2 | 6/2006 | Selli et al. |
| 7,210,961 | B2 | 5/2007 | Berg |
| 7,667,614 | B2 | 2/2010 | Helm et al. |
| 2002/0014128 | A1* | 2/2002 | Kroll et al. ............ 73/866.5 |
| 2005/0284238 | A1* | 12/2005 | Wilkie et al. ........... 73/862.045 |
| 2006/0164230 | A1 | 7/2006 | DeWind et al. |
| 2006/0280657 | A1 | 12/2006 | Farina et al. |
| 2007/0146134 | A1 | 6/2007 | Belden et al. |
| 2008/0142171 | A1 | 6/2008 | Koop et al. |
| 2011/0059647 | A1* | 3/2011 | Machado et al. ........ 439/488 |
| 2011/0101967 | A1 | 5/2011 | Kayserman et al. |

FOREIGN PATENT DOCUMENTS

| | | |
|---|---|---|
| DE | 19512915 C1 | 8/1996 |
| DE | 102006007951 | 8/2007 |
| DE | 102008042314 | 4/2010 |
| DE | 202009009048 | 12/2010 |
| EP | 0407578 | 1/1991 |
| EP | 2177881 | 4/2010 |
| FR | 2643640 A1 | 8/1990 |
| WO | 2004047246 A1 | 6/2004 |

OTHER PUBLICATIONS

Efector 100 Inductive Sensors—IMC3040-BPKG/K1/US; IFM Electronic catalog page; Jun. 7, 2007.
BES Q40KFU-PSC20A-S04G Inductive Sensors; Balluff Sensors Worldwide catalog page; www.balluff.com; Feb. 15, 2008.
Inductive Proximity Switch—Part No. IQ350NK70TA3; Wenglor catalog page; admitted to be prior art at least as early as Nov. 21, 2010.
Uprox+ Inductive Sensor; Turck Industrial Automation catalog page; www.turck.com; Aug. 11, 2009.
Bulletin 871P VersaCube Inductive Proximity Sensors; Allen-Bradley; www.ab.com/catalogs; Mar. 2009.
Model No. NBN40-L2M-E2-V1 Inductive Sensor; Pepperl+Fuchs catalog page; www.pepperl-fuchs.com; Jun. 17, 2010.
Model No. NBN40-L3M-A2-C3-V1 Inductive Sensor; Pepperl+Fuchs catalog page; www.pepperl-fuchs.com; Oct. 26, 2010.
Bulletin 871F Flat Pack Inductive Proximity Sensors catalog pages; Allen-Bradley; www.ab.com/catalogs; Mar. 2009.
EPO Communication for European application No. 12150026.8 dated Feb. 20, 2015, 5 pages.
EPO Communication for European application No. 12150028.4 dated Mar. 16, 2015, 2 pages.
Mounting and Wiring Instructions 871P VersaCube Proximity Sensor, published Nov. 1999, 2 pages; retrieved from url: http://literature.rockwellautomation.com/idc/groups/literature/documents/in/871p-in002 -en-p.pdf.
Wenglor operating instructions, published Aug. 9, 2010, believed to have been available for sale as of at least Jan. 2005, retrieved from url: https://www.wenglor.com on Nov. 21, 2010, 2 pages.
Turck Inc. Bi15-CK40-AN6X2-H1141 drawing, published Nov. 1, 2002, 1 page.
Turck Inc. Bi15-CK40-AZ3X2/S531 W/ BS 2.1 drawing, published Dec. 10, 2008, 1 page.
EPO Communication for European application No. 12150028.4 dated Feb. 5, 2015, 8 pages.
EPO Communication for European application No. 12150026.8 dated Jul. 24, 2015, 11 pages.

* cited by examiner

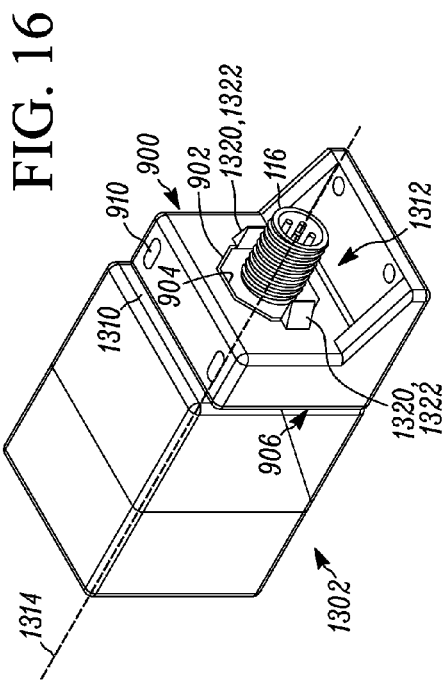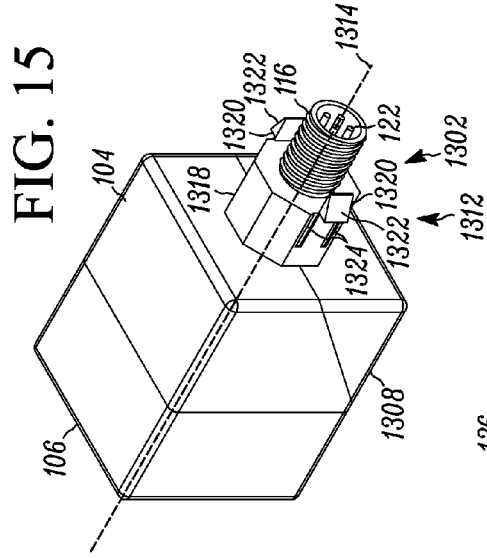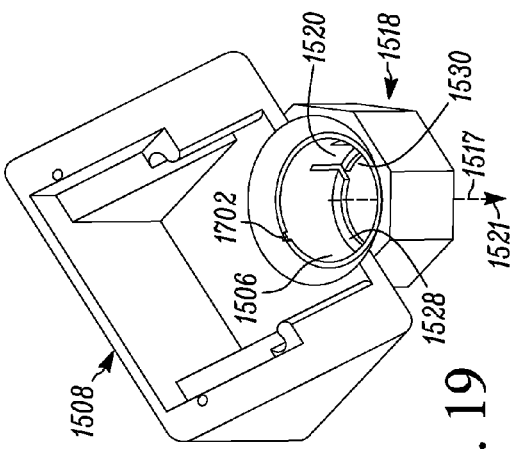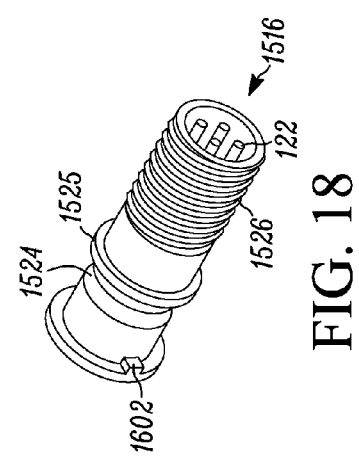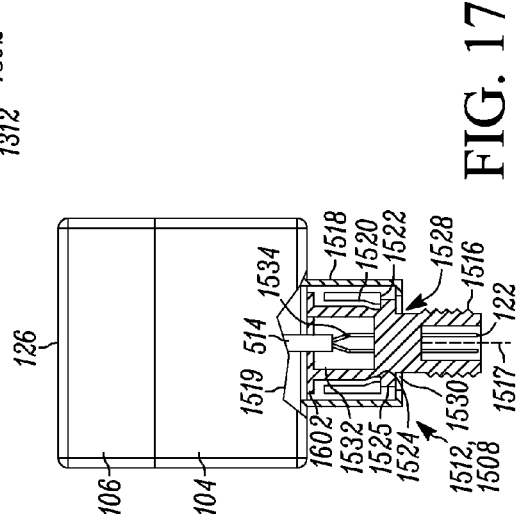

SENSING ASSEMBLY COMPONENTS AND METHODS OF ASSEMBLING, MOUNTING AND ORIENTATING SAME

CROSS-REFERENCE TO RELATED APPLICATIONS

This application claims the benefit of U.S. provisional patent application No. 61/428,921, which was filed on Dec. 31, 2010 and entitled "Sensing Assembly Components and Methods of Assembling, Mounting and Orientating Same", and which is hereby incorporated by reference herein.

STATEMENT REGARDING FEDERALLY SPONSORED RESEARCH OR DEVELOPMENT

--

FIELD OF THE INVENTION

The present invention relates to sensing devices and, more particularly, relates to various sensing assemblies and assembly components, and/or methods for assembling, mounting, and/or orientating same.

BACKGROUND OF THE INVENTION

Sensing devices of many different types are commonly employed in a variety of environments and applications. Sensing devices encompass a broad spectrum of devices including, for example, various light-sensing devices such as laser-sensing devices, light sensing devices that are capable of distinguishing among different colors of visible light, and devices for sensing various other types of radiation including infrared radiation or heat, microwave radiation, and x-ray radiation. Additionally, other sensing devices include, for example, devices that are capable of sensing the positions of other structures, acoustic sensors, vibration sensors, motion sensors such as accelerometers, orientation sensors involving gyroscopes, and numerous other types of sensing devices.

Sensing devices are employed in a wide variety of industrial, commercial, military, residential and other environments and applications. For example, in industrial environments, light sensors are often employed in conjunction with conveyor systems such as those used in assembly lines. Such light sensors are often used to detect the presence of objects moving down an assembly line and to determine whether a given object has entered or exited a particular region of the assembly line. Light sensors of similar design can also be used in residential applications, for example, in connection with garage door openers. Also for example, in many commercial facilities as well as residential homes, various sensing devices are used in security systems in order to detect the presence of potential intruders within or nearby those facilities or homes. Sensing devices can further be implemented on vehicles, for example, to detect the presence of objects behind vehicles. Indeed, sensing devices are ubiquitous in today's modern world.

Although in some cases sensing devices are free-standing, typically sensing devices are mounted upon or in relation to other supporting structures. Further, in many if not most circumstances, it is desirable that the sensing devices be mounted in relation to such supporting structures in a fixed manner, or at least in a manner by which the location and orientation of a given sensing device relative to the supporting structure(s), target(s), and/or signal source(s) are known or predictable. For example, in the case of a light sensing device implemented in a manufacturing assembly line, it is typically desired that the light sensing device be fixedly orientated in a particular direction so as to be aligned to receive a light beam from a light source located elsewhere. The mounting of light sensing devices in other environments, such as in the case of garage door openers, similarly can entail the careful, fixed positioning of the sensing devices.

Although it is often desirable to be able to fixedly and reliably orient a sensing device in a desired direction or otherwise, it is also often desirable that a sensing assembly be suitable for use in a variety of locations and environments. For this reason, some known sensing assemblies include multiple components that can be repositioned relative to one another so as to allow the orientation of the sensor face (e.g., the face of the sensor at which light or another signal is incident on the sensor) to be varied in its position relative to another supporting portion of the sensing assembly by which the sensing assembly is mounted to a supporting structure such as a wall. Although such sensing assemblies can often provide desired flexibility in terms of positioning of the sensor face, some such sensing assemblies are disadvantageous in that the reorientation of the different sensing assembly components requires time-consuming efforts such as screwing and unscrewing bolts used to secure the various components to one another.

Therefore, it would be advantageous if improved sensing devices, sensing assemblies and/or assembly components, and/or methods for assembling, mounting, and/or orientating same, can be developed so as to address one or more of the above issues and/or one or more other goals.

BRIEF SUMMARY OF THE INVENTION

In at least some embodiments, the present invention relates to a sensing assembly. In one such example embodiment, the sensing assembly includes a housing portion including a primary mating face, and a base portion including a secondary mating face. The sensing assembly further includes at least one first retaining structure provided in relation to a first of the primary and secondary mating faces, and at least one second retaining structure provided in relation to a second of the primary and secondary mating faces. Also, the at least one first retaining structure and at least one second retaining structure are configured to engage one another so as to at least partly retain the housing and base portions together, upon the primary and secondary mating faces being positioned adjacent to one another along a junction and shifted relative to one another along the junction.

Further, in at least one additional example embodiment, a sensing assembly includes a main body including at least a housing portion, and a mounting portion protruding outward from the main body. The mounting portion includes an outer connector section including at least one electrical connector, and further includes an intermediate section that includes an outer surface that either has substantially a shape of a polygon or is at least partly threaded, where the intermediate section is positioned in between the main body and the outer connector section. Additionally, the intermediate section has an intermediate section outer diameter, the outer connector section has an outer connector section outer diameter, and the intermediate section outer diameter is greater than the outer connection section outer diameter.

Also, in at least one further example embodiment, a method of assembly includes providing a housing portion of a sensing assembly, the housing portion including a primary mating face, and providing a base portion of the sensing assembly, the base portion including a secondary mating face and also a mounting portion protruding outward from a main body of the base portion, where a first of the primary and secondary mating faces includes a first retaining structure protruding therefrom, and a second of the primary and secondary mating faces includes a second retaining structure protruding therefrom. The method also includes assembling the housing portion to the base portion by arranging the housing portion in relation to the base portion so that the primary and secondary mating faces are adjacent to one another along a junction and so that the first and second retaining structures are engaged with one another.

BRIEF DESCRIPTION OF THE DRAWINGS

FIG. 15 is a perspective view of a further example sensing assembly in accordance with another embodiment of the present invention;

FIG. 16 is a perspective view of the mounting bracket of FIG. 9 attached to the sensing assembly of FIG. 15;

FIG. 17 is a cross-sectional view of portions of another example sensing assembly in accordance with yet another embodiment of the present invention;

FIG. 18 is a perspective of a connector portion that is one of the portions of the sensing assembly of FIG. 17;

FIG. 19 is a perspective of a base portion that is one of the portions of the sensing assembly of FIG. 17;

DETAILED DESCRIPTION OF THE PREFERRED EMBODIMENT

A variety of sensing assemblies and sensing assembly components are described below. In general, the sensing assemblies and sensing assembly components described below should be understood as representative of any of a variety of types of sensing assemblies and components that can be used in a variety of applications. For example, in some embodiments, the sensing assemblies are proximity sensors. Also for example, in some embodiments, the sensing assemblies can be light sensing devices that can be implemented in conveyor systems as are often found in manufacturing and other commercial facilities in conjunction with assembly lines or the like. Also, in other embodiments, the sensing assemblies can include or encompass a variety of other types of assemblies, components or devices including, for example, other light-sensing devices (e.g., color-sensing devices, etc.), devices for sensing various other types of radiation (e.g., infrared, microwave, x-ray, etc.), position-sensing devices, acoustic sensors, vibration sensors, motion sensors such as accelerometers, orientation sensors involving gyroscopes, and numerous other types of sensing devices. Further, the sensing assemblies can be suited for any of a variety of industrial, commercial, military, residential and other environments and/or be employed in connection with a variety of different applications.

Figure 1:
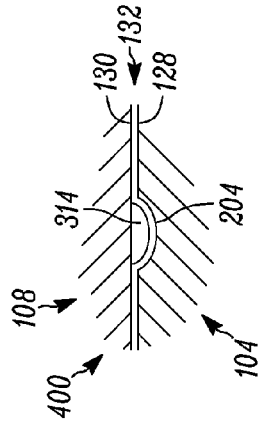
FIG. 1 is a perspective view of a sensing assembly in accordance with one example embodiment of the present invention.
Figure 3:
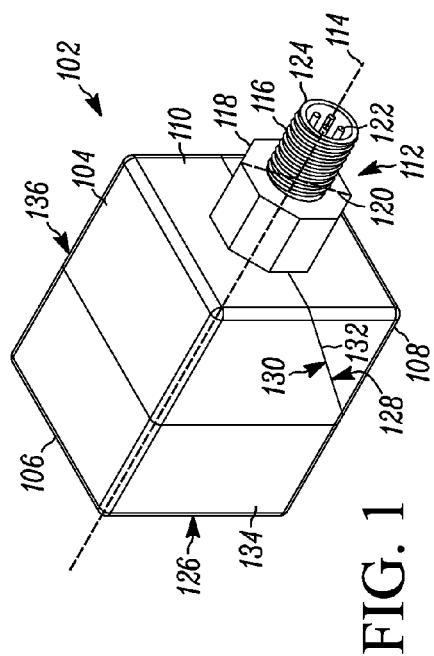
FIG. 3 is a perspective view of a base portion of the sensing assembly of FIG. 1.

Referring particularly to FIG. 1, in a first embodiment, a sensing assembly 102 (in this example, a proximity sensor sensing assembly) includes a housing portion 104 with a cap 106 and a base portion 108. As shown, the housing and base portions 104, 108 together when assembled form a substantially cubic structure. Further as shown, jutting outward from a rear surface 110 of the sensing assembly 102 is a mounting portion 112 that, as will be discussed further with reference to FIG. 3, is in the present embodiment a part of the base portion 108. The mounting portion 112 particularly extends outward along a central axis 114 of the sensing assembly 102 and includes a cylindrical threaded connector 116 at its far end and a multi-faceted mounting structure 118 positioned in between the threaded connector 116 and the rear surface 110 of the sensing assembly 102.

In the present embodiment, the multi-faceted mounting structure 118 is octagonal in cross-section as viewed in a plane perpendicular to the central axis 114 (that is, the octagonal sides extend around the central axis). An outer diameter 120 of the multi-faceted mounting structure as measured between two diametrically-opposed outer points of that structure is substantially greater than (e.g., approximately double that of) the threaded connector 116. Although the sizes of the sensing assembly 102 and its components can vary depending upon the embodiment, in the present embodiment the sensing assembly 102 particularly can have dimensions of 40 millimeters (mm) by 40 mm (in terms of its outer surfaces that together form a cubic structure) while the outer diameter 120 of the multi-faceted mounting structure 118 can be 22 mm.

Although in the present embodiment the multi-faceted mounting structure 118 is octagonal, in other embodiments the cross-section of that structure can take the form of some other polygon having any arbitrary number of sides more than two (e.g., a hexagon). Although not required in all embodiments, typically the cross-sectional shape of the multi-faceted mounting structure 118 will at least have five or more sides, and the shape will be that of a regular polygon having all interior angles being equal and all outermost points of the polygon lying along a shared circle. As discussed further below with respect to FIGS. 9, 11, and 12, the outer shape of the multi-faceted mounting structure 118 is particularly configured to facilitate mounting of the sensing assembly 102 to a mounting bracket having a mounting hole with complimentary multi-faceted internal surfaces.

With respect to the threaded connector 116 protruding from the multi-faceted mounting structure 118, this structure can, depending upon the embodiment, either be rigidly affixed in relation to the mounting structure or alternatively can rotate relative to that mounting structure. In at least some embodiments where rotation is possible (and as further discussed below with respect to FIGS. 17-19), that rotation is limited to 360 degrees or less. Also as shown in FIG. 1, one or more (in this case, multiple) connector pins 122 are exposed at a far end 124 of the threaded connector 116 (the pins are within a cylindrical interior of the threaded connector). It will be understood that, by way of the multiple connector pins 122, a complementary connector can be connected to (e.g., plugged in relation to) the threaded connector 116 and thus electrical signals (or, depending upon the embodiment, other signals such as optical signals) can be communicated from or to the sensing assembly to or from a remote device or location (not shown). It will be understood that, in the present embodiment, the sensing assembly 102 is configured to receive and/or transmit sensing signals by way of a front surface 126 along the cap 106 of the housing portion 104, which is the side of the sensing assembly 102 that is opposite that of the rear surface 110.

The housing portion 104, cap 106 and base portion 108 of the sensing assembly 102 can each be made of one or more plastic materials, and the housing portion can particularly be attached to the cap by a variety of methods including press fit, gluing, or ultrasonic welding methods. Alternatively, the base portion 108 can be made of a metal material. Also, alternatively, the housing portion 104 can be made of a metal material while the cap 106 is made of a plastic material, or the housing portion can be made of a metal material and/or the cap 106 can be made of the same or a different metal material such as stainless steel (or a titanium alloy). As will be discussed further with respect to FIGS. 2 and 3, the housing portion 104 has a mating surface 128 by which it interfaces a complementary mating surface 130 of the base portion 108 such that, when the two portions are assembled as shown in FIG. 1, the two portions are in contact with one another along a junction 132. In the present embodiment, the junction 132 (and the mating surfaces 128, 130) extend along a plane that passes through the central axis 114 along a 45 degree angle and that is perpendicular relative to two diametrically-opposed side outer surfaces 134 and 136 of the sensing assembly 102 that each extend between the front surface 126 and the rear surface 110.

Figure 2:
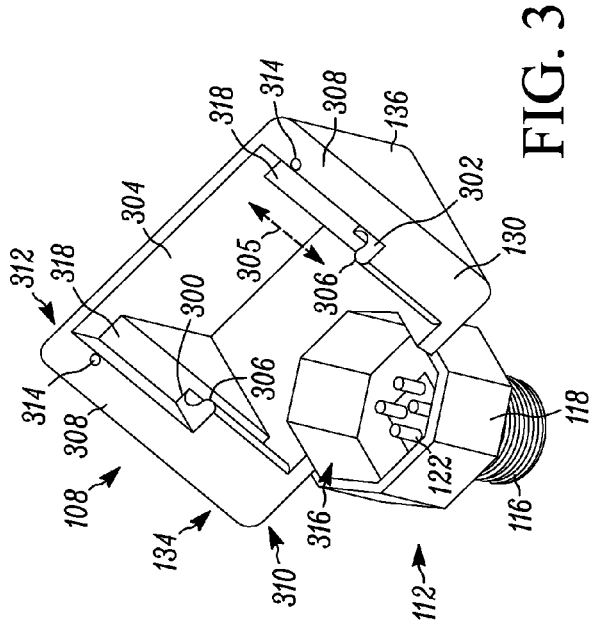
FIG. 2 is a perspective view of a housing portion of the sensing assembly of FIG. 1.

Referring additionally to FIGS. 2 and 3, the housing portion 104 and base portion 108 of the sensing assembly 102 of FIG. 1 are respectively shown disassembled from (independently of) one another to illustrate a mechanism by which those portions can be coupled (assembled) to one another. Referring particularly to FIG. 2, a perspective view of the housing portion 104 is provided. As shown, in addition to the front surface 126, the rear surface 110, the side surfaces 134 and 136 (more particularly, portions of those rear and side surfaces, with the other portions being provided by the base portion 108), and the 45-degree-angled mating surface 128 already discussed with respect to FIG. 1, the housing portion 104 further includes a pair of mounting structures 200, 202 that protrude from the mating surface of the housing portion. Further as shown, the mating surface 128 in the present embodiment actually includes two half-surfaces 203 separated by a recessed pocket 206. Each respective one of the mounting structures 200, 202 protrudes from a respective one of those half-surfaces 203. A round cable exit 208 is located in the center of the recessed pocket 206 between the half-surfaces 203 and mounting structures 200, 202 protruding therefrom.

In the present embodiment, the mounting structures take a form similar to dovetails insofar as each of the mounting structures 200, 202 extends outward away from the mating surface 128 and generally first decreases slightly but then increases significantly in cross-sectional width as one proceeds farther away from the mating surface, such that while inner surfaces 210 of the mounting structures are flat or substantially flat, outer surfaces 212 of the mounting structures are concave. Lengthwise, as measured along an axis 205 parallel to the mating surface 128 (but perpendicular to an axis that would extend between the two half-surfaces 203 across the recessed pocket 206), each of the mounting structures 200, 202 extends about one-third of the length of the mating surface as measured along that axis, and each of the mounting structures is positioned at a respective location approximately midway along its respective mating surface. Notwithstanding the particular shape of the mounting structures 200, 202 shown in FIG. 2, in other embodiments the mounting structures can take other forms, including for example the form of a traditional "V" shaped dovetail. Also it is possible that, in other embodiments, less than or more than two mounting structures will be present.

Further as shown in FIG. 2, four recessed spherical dimple pockets 204 are located proximate opposite corners of the mating surface 128, with two of the pockets on each respective one of the half-surfaces 203. Two of the dimple pockets 204 are positioned along a first side 214 of the mating surface 128 (which extends along the rear surface 110), with one on each of the half-surfaces 203, while two others of the dimple pockets 204 are proximate a second side 216 of the mating surface opposite the first side, also with one on each of the half-surfaces. In the present embodiment, the spherical dimple pockets 204 more particularly are symmetrically positioned on the mating surface 128 in terms of their positions relative to the four corners (or rounded corner edges) of the mating surface 128, and also symmetrical in terms of their positions relative to the mounting structures 200, 202. Although shown as spherical pockets, it should be understood that each of these recessed pockets can take a variety of other shapes depending upon the embodiment including, for example, a rectangular slot.

Next referring to FIG. 3, a perspective view of the base portion 108 that complements the housing portion 104 of FIG. 2 is shown. In addition to the side surfaces 134, 136 (or, more accurately, portions of those side surfaces, with the other portions being provided by the housing portion 104) and the 45-degree-angled mating surface 130, the base portion 108 includes a pair of mounting structures 300, 302 that extend outward from within a recessed pocket 304 of the base portion up to the mating surface 130 so as to be flush with that mating surface. More particularly, as in the case of the mating surface 128 of the housing portion 104, the mating surface 130 of the base portion 108 actually includes two half-surfaces 308 that are positioned on opposite sides of the recessed pocket 304, and the respective mounting structures 300, 302 are positioned along the recessed pocket on opposite sides thereof.

As with the mounting structures 200, 202, the mounting structures 300, 302 take a form similar to dovetails insofar as the cross-sectional width of each of the mounting structures 300, 302, as one proceeds outward toward the mating surface 130, first decreases slightly but then increases significantly. In contrast to the mounting structures 200, 202, which have the outer surfaces 212 that are concave facing outwardly away from the recessed pocket 206, the mounting structures 300, 302 have concave surfaces 306 facing inwardly toward the recessed pocket 304 (as the mounting structures 300, 302 are provided inwardly of the mating surface 130, the mounting structures lack flat surfaces that would correspond to the flat surfaces 210 of the mounting structures 200, 202). Thus, the mounting structures 300, 302 are substantially complementary to the mounting structures 200, 202 in terms of their interfacing concave surfaces.

Lengthwise, as measured along an axis 305 parallel to the mating surface 130 (but perpendicular to an axis that would extend between the two half-surfaces 308 across the recessed pocket 304), each of the mounting structures 300, 302 extends about one-half of the length of the mating surface as measured along that axis, and each of the mounting structures is positioned at a first side 310 of the mating surface from which the mounting portion 112 protrudes rather than a second side 312 opposite the first side. Separating each of the mounting structures 300, 302 from the second side 312 are respective receiving portions 318 of the recessed pocket 304 that, as will be discussed further below with respect to FIGS. 5-8, are configured to receive the mounting structures 200, 202 of the housing portion 104 when the base portion 108 and housing portions are coupled to one another. Further as discussed below, the relative positioning and lengths of the mounting structures 200, 202 of the housing portion 104 and the mounting structures 300, 302 of the base portion 108 allow for the base portion to be attached to the housing portion, by way of the same mounting structures, in either of two rotational orientations.

Notwithstanding the particular shape of the mounting structures 300, 302 shown in FIG. 3, in other embodiments the mounting structures can take other forms, including for example the form of a traditional "V" shaped dovetail. Also it is possible that, in other embodiments, less than or more than two mounting structures will be present. Also, while in the present embodiment it is the mounting structures 200, 202 that protrude out from the mating surface 128 of the housing portion 104 while the mounting structures 300, 302 are substantially positioned inwardly of the mating surface 130 (aside from having outer edges flush with that mating surface), in other embodiments an opposite arrangement can be implemented where it is the mounting structures of the housing portion that have a substantially inward position and it is the mounting structures of the base portion that extend outward from the mating surface of that structure.

Further as shown in FIG. 3, the base portion 108 includes two raised spherical dimples (protrusions) 314 that are located proximate opposite corners (or rounded corner edges) of the mating surface 130 proximate the second side 312 of that mating surface, with one of the dimples on each respective one of the half-surfaces 308. In the present embodiment, the spherical dimples 314 are symmetrically positioned on the mating surface 130 in terms of their positions relative to the opposite corners of the mating surface along the second side 312. As discussed further with respect to FIGS. 5-8, the spherical dimples 314 are positioned so as to engage (extend into) the two of the dimple pockets 204 of the housing portion 104 positioned along the first side 214 when the base portion 108 is coupled to the housing portion in a first orientation, and to engage (extend into) the other two of the dimple pockets 204 of the housing portion positioned along the second side 216 when the base portion is coupled to the housing portion in a second reverse orientation.

Figure 4:
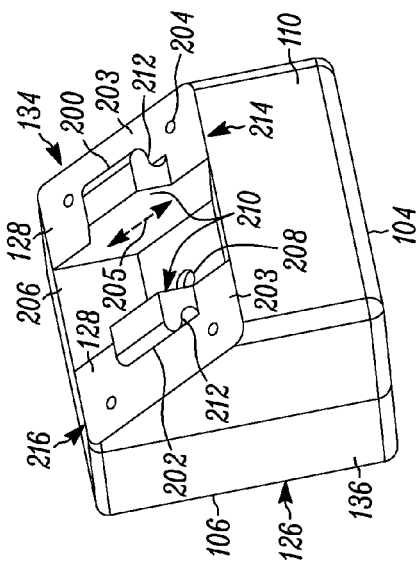
FIG. 4 is cross-sectional cutaway view of a combination dimple/pocket arrangement employed by the sensing assembly of FIG. 1.

As discussed further with reference to FIG. 4, the spherical dimples 314 are shaped to be complementary with respect to the recessed spherical dimple pockets 204 of the housing portion 104. Nevertheless, although shown as spherical dimples 314 in FIG. 3, it should be understood that each of these dimples/raised protrusions can take a variety of other shapes depending upon the embodiment including, for example, a rectangular protrusion. Also, while the spherical dimples 314 in the present embodiment are symmetrically positioned, this need not be the case in all embodiments. For example, in one embodiment, one of the spherical dimples 314 could be closer to its respective corner than the other of the spherical dimples. In such case, to allow for proper engagement of the spherical dimples of the base portion with respect to corresponding ones of the dimple pockets of the housing portion, the relative positioning of the dimple pockets of each respective pair of two dimple pockets either along the first side 214 or the second side 216 would be correspondingly adjusted so that the dimple pockets and dimples would be aligned.

In addition to the aforementioned structures, as also shown in FIG. 3, the base portion 108 additionally includes the mounting portion 112 with the octagonally-shaped multi-faceted mounting structure 118 as well as the threaded connector 116 with the pins 122 protruding from that mounting structure. As particularly shown, the pins 122 also extend inwardly into (and are visible within) an interior epoxy pocket 316 that is recessed into the multi-faceted mounting structure 118. The interior epoxy pocket 316 can be filled with epoxy during assembly.

Turning to FIG. 4, a cross-sectional, cutaway view is provided to show how one of the dimple pockets 204 of the housing portion 104 of FIGS. 1-2 can receive and engage one of the dimples 314 of the base portion 108 of FIGS. 1 and 3 when the housing portion and base portion are coupled to one another (as discussed further with respect to FIGS. 5-8). As shown, the raised dimple 314 extends (drops) into the dimple pocket 204 so that, in combination, a dimple locking mechanism 400 is formed that restricts sideways shifting of the base portion relative to the housing portion (e.g., shifting along the junction 132 of the mating surfaces 128, 130 of the housing and base portions). As will be discussed further below, due to the additional interaction of the mounting structures 200, 202 and 300, 302, the restricting of shifting in this manner effectively locks the housing portion 104 in relation to the base portion 108 so that the two portions are substantially locked in place relative to one another in the absence of a sufficient disassembly force. The design of the dimple locking mechanism 400 is such that, when adequate force is applied, the dimple 314 will lift out of the recessed spherical dimple pocket 204 to release the locking mechanism, thereby allowing the base and housing portions 108 and 104 to be separated.

Notwithstanding the above description, a variety of other dimple and recessed dimple pocket locking mechanisms can be employed. For example, in other embodiments, locking mechanisms found on the Photoswitch® Bulletin 44B photoelectric sensor swivel connector available from Rockwell Automation, Inc. of Milwaukee Wis. can be employed, or a locking mechanism as used on USB (Universal Serial Bus) flash drive caps can be employed. While in the present embodiment it is envisioned that the dimple pockets 204 are on the housing portion 104 while the dimples 314 are on the base portion 108, in other embodiments the locating of the dimples and pockets can be reversed such that the dimples are on the housing portion and the dimple pocket are on the base portion. Also, just as the dimples can take on other shapes and forms as described above, so to can the dimple pockets (typically, though not always, the shapes of the dimples and pockets will be complementing).

Figure 5:
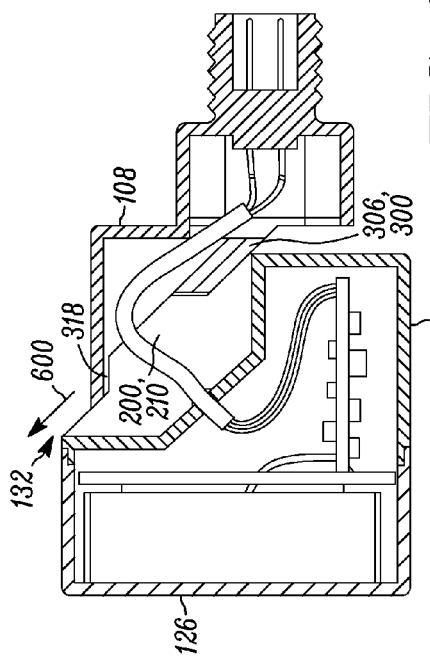
FIGS. 5 and 6 are cross-sectional exploded views of the sensing assembly of FIG. 1 at different times during a process of assembling the base portion of the sensing assembly in relation to the housing portion of the sensing assembly.

Turning now to FIGS. 5-8, the manner of assembling of the housing portion 104 and base portion 108, by way of the mounting structures 200, 202, 300, 302 and dimple mechanisms 400 achieved by the recessed dimple pockets 204 and raised dimples 314, is illustrated in greater detail. Also, certain internal components of the sensing assembly 102 within the housing portion 104 and base portion 108 are shown in more detail. Referring particularly to FIG. 5, a cross-sectional view of the sensing assembly 102 taken along the central axis 114, when the base portion 108 is exploded from the housing portion 104, is provided. As shown, the sensing assembly 102 internally includes a coil assembly 500, which can include for example a ferrite core and a copper wire wound bobbin, a copper wire wound bobbin alone, or a planar coil consisting of one or more printed circuit boards (PCBs) with spiral traces. As shown, the coil assembly 500 is attached to an internal surface 502 of the front surface 126 of the cap 106, which constitutes the sensing face of the sensing assembly 102. Although not always required, in the present embodiment a copper or brass shield 504 surrounds the coil assembly 500 along the sides and/or the back to facilitate some sensing modes, such as the shielded sensing mode, or to improve performance.

Further as shown, wires 506 connect the coil assembly 500 to a printed circuit board (PCB) 508 containing sensing circuitry. The printed circuit board 508 containing the sensing circuitry is soldered (by way of solder 510) at a right angle to another structure (which can be another PCB) 512 located behind the coil assembly 500. In another embodiment, the sensing circuitry can be located on this other structure (in which case it can be a PCB) 512. Additionally, a cable (or flex circuit) 514 that is soldered to the PCB 508 passes through the cable exit 208 of the housing portion 104 and into the base portion 108, where it is further soldered to (or otherwise attached to) the pins 122 in the threaded connector 116, thereby allowing for a flexible connection of the base portion/pins with the internal electronic circuitry of the housing portion 104.

In some cases, an adhesive can be used near the cable exit 208 to temporarily fix the cable 514 in relation to the housing portion 104. Alternatively, a grommet (not shown) can also or instead be used to provide a seal between the cable and the cable exit. Further, in the present embodiment, the epoxy pocket 316 in the multi-faceted mounting structure 118 of the base portion 108 is filled with epoxy potting to seal the pin 122 and connections between the pins and the cable 514 from the environment. Similarly, an internal volume 516 within the housing portion 104 (and cap 106) is also filled with epoxy potting, or similar material, to facilitate heat dissipation from the sensing assembly 102 (particularly from the electronic circuitry) and to provide structural rigidity that helps the sensing assembly to withstand mechanical shock and vibration.

Figure 6:
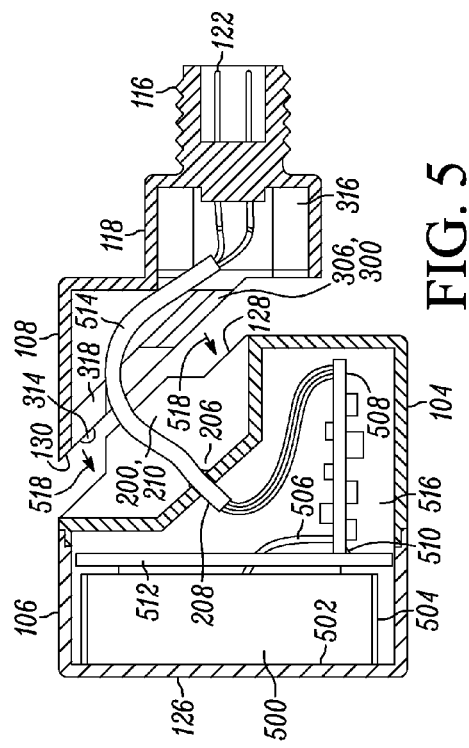

Referring still to FIG. 5 and additionally to FIG. 6, an example manner of assembling the base portion 108 in relation to the housing portion 104 is illustrated. As illustrated particularly in FIG. 5, in a first step, the base portion 108 is positioned and moved in the direction of arrows 518 so that the mating surface 130 approaches and ultimately abuts the mating surface 128 of the housing portion 104 so as to arrive at a relative positioning as shown in FIG. 6 and form the junction 132 between those mating surfaces. When initially positioned in this manner, the base portion 108 is shifted relative to the housing portion 104 along the junction 132 such that the mounting structures 200, 202 of the housing portion (one of which, the mounting structure 200, is visible in FIGS. 5-6) do not yet engage the mounting structures 300, 302 (one of which, the mounting structure 300, is visible in FIGS. 5-6) of the base portion. Rather, the mounting structures 200, 202 are shifted relative to the mounting structures 300, 302 along the direction of an arrow 600 parallel to the junction 132, such that the mounting structures 200, 202 extend into the receiving portions 318 of the base portion 108 (in particular, the mounting structure 200 is shown to extend into a complementary one of the receiving 318 in FIG. 6).

Figure 7:
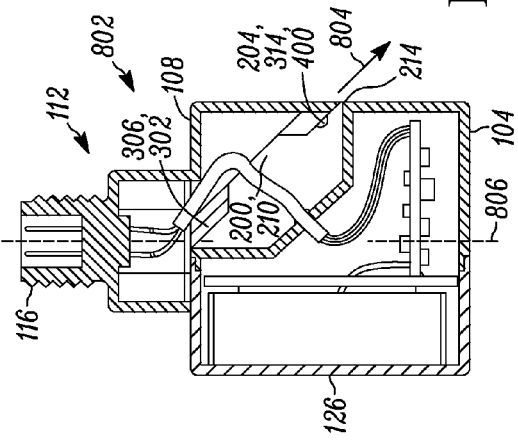
FIG. 7 is a further cross-sectional view of the sensing assembly of FIG. 1 after the conclusion of the assembly process of FIGS. 5 and 6.

Upon positioning the housing portion 104 and base portion 108 in the manner shown in FIG. 6, the assembly process is then completed by sliding the base portion relative to the housing portion along the junction 132 in the direction indicated by the arrow 600 of FIG. 6. This causes the mounting structures 300, 302 of the base portion 108 to engage the mounting structures 200, 202 of the housing portion 104, as shown in FIG. 7. When the base portion 108 is slid sufficiently in relation to the housing portion 104 so that the two portions are properly aligned, the dimples 314 of the base portion drop into, and engage, two of the recessed spherical dimple pockets 204 of the housing portion. In the example of FIG. 7, the dimples 314 of the base portion 104 particularly engage the two of the spherical dimple pockets 204 of the housing portion 104 that are closest to the second side 216. When fully engaged, the dimples 314 on the base portion 108 are seated in the recessed spherical dimple pockets 204 of the housing portion 104 in a manner that prevents unintended separation of the housing and base portions. In some embodiments, the dimples/recessed pockets (or other features forming the locking mechanism) can also be designed to provide a slight interference fit that will also aid in preventing unintentional separation.

As also illustrated, given the size and design of the mounting components 200, 202 and 300, 302, the outer (concave) surfaces 212 of the mounting components 200, 202 do not fully overlap the concave (inner) surfaces 306 of the mounting components 300, 302 even when the base portion 108 is fully assembled to (and aligned with) the housing portion 104. Rather, given the design of the mounting components 200, 202, 300, 302, portions of the concave surfaces 306 remain out of contact with the outer surfaces 212 and likewise portions of the surfaces 212 remain out of contact with the surfaces 306. Even so, due to the portions of the outer surfaces 212 and concave surfaces 306 that are in contact with one another, the housing portion 104 and base portion 108 are solidly affixed with respect to one another when in the position shown in FIG. 7. For clarification, it should be noted that, while the particular cross-sectional views provided in FIGS. 5-7 show the inner surface 210 rather than the outer surface 212 of the mounting structure 200 of the housing portion 104, it is the outer surface 212 (as shown in FIG. 2) that engages the concave surface 306 of the mounting structure 300 of the base portion 108.

Figure 8:
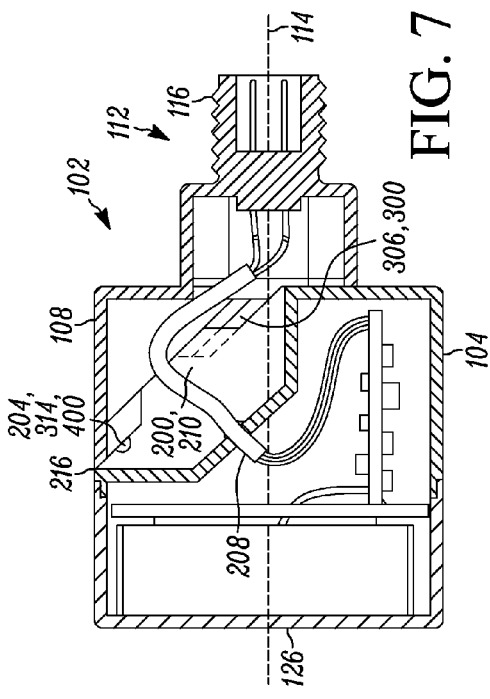
FIG. 8 is an additional cross-sectional view of the sensing assembly of FIG. 1, where the housing and base portions of the assembly are assembled in a manner that is reversed relative to that shown in FIG. 7 (and FIG. 1)

Referring additionally to FIG. 8, notwithstanding that the base portion 108 and housing portion 104 can be assembled with one another to form the sensing assembly 102 as shown in both FIG. 7 and FIG. 1, the above-described features provided on the housing portion and base portion also allow the base portion to be reversed 180 degrees in its orientation relative to the housing portion, about an axis perpendicular to the junction 132. FIG. 8 illustrates particularly a second version of the sensing assembly, shown as a sensing assembly 802, in which the base portion 108 is oriented in this opposite manner relative to the housing portion 104. Assembly is accomplished in substantially the same manner as that illustrated by FIGS. 5-7 except that the base portion 108 initially approaches the housing portion 104 having an orientation that is reversed 180 degrees relative to the orientation shown in FIGS. 5-6 (about an axis perpendicular to the junction 132) and, once the base portion mating surface 130 is in contact with the housing portion mating surface 128, the base portion is slid in a direction corresponding to an arrow 804 shown in FIG. 8 to be opposite the direction of the arrow 600 of FIG. 6.

As a result of this reversed manner of assembly, upon the sensing assembly 802 being fully assembled, the respective mounting components 200, 202, 300, 302 are reversed in terms of their relative contact relative to that of the sensing assembly 102. That is, the mounting component 200 is in contact with the mounting component 302 (rather than the mounting component 300) as shown in FIG. 8 while the mounting component 202 is in contact with the mounting component 300 rather than the mounting component 302 (this is not shown in FIG. 8). Further, while in the sensing assembly 102 the dimples 314 are engaged with the two recessed dimple pockets 204 that are proximate the second side 216 rather than the first side 214, in the sensing assembly 802 as shown in FIG. 8 the dimples 314 are engaged with the two recessed spherical dimple pockets 204 that are proximate the first side 214 of the housing portion 104 rather than the second side 216.

By virtue of this, while the front surface 126 (sensing face) of the sensing assembly 102 is perpendicular to the central axis 114 extending through the mounting portion 112/threaded connector 116 as shown in FIG. 7, in the sensing assembly 802 the front surface 126 (sensing face) of the sensing assembly is parallel to an axis 806 extending through the mounting portion 112/threaded connector 116. Thus, while the mounting portion 112/threaded connector 116 jut out from the sensing assembly 102 in a manner diametrically opposed to the directional orientation of the sensing face (that is, the direction out away from the front surface 126), in the sensing assembly 802 the mounting portion 112/threaded connector 116 jut out from the sensing assembly in a direction at a right angle relative to the directional orientation of the sensing face.

Figure 9:
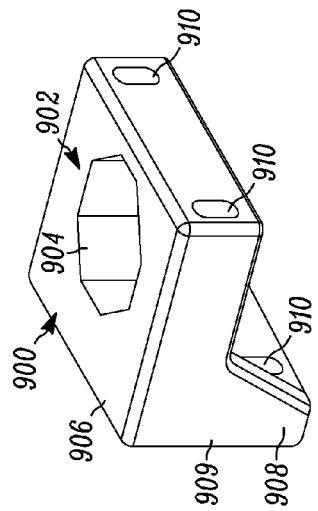
FIG. 9 is a perspective view of a mounting bracket that can be utilized in conjunction with the sensing assemblies of FIGS. 1, 11, and 15 to affix those sensing assemblies to a supporting structure (not shown)

Turning now to FIG. 9, a perspective view is provided of an exemplary mounting bracket 900 that can be used to affix the sensing assemblies 102, 802 of FIGS. 1-8 to a support structure such as a wall (not shown). Although the mounting bracket 900 is described below as a component separate from the sensing assemblies 102, 802, it will be understood that the mounting bracket can also itself be considered a sensing assembly component such that, when one of the sensing assemblies 102, 802 is affixed to the mounting bracket, the overall combination can itself be considered a sensing assembly.

As shown, the mounting bracket 900 particularly includes a multi-faceted mounting hole 902 that in the present embodiment has an internal surface 904 having multiple facets intended to be complementary to those of the multi-faceted mounting structure 118 discussed above. Thus, in the present embodiment, the internal surface 904 of the multi-faceted mounting hole 902 is in the shape of an octagon, so as to complement the octagonal shape of the multi-faceted mounting structure 118. As discussed above with respect to the multi-faceted mounting structure 118, notwithstanding the present example, in other embodiments, the internal surface of the multi-faceted mounting hole can have more or less facets than eight (e.g., six) and, although the present embodiment employs a regular polygon shape, in other embodiments the shape need not be that of a regular polygon.

Further as shown in FIG. 9, the mounting bracket 900 particularly provides a support platform 906 upon which the sensing assemblies 102, 802 can be supported when the mounting portion 112 is inserted through the mounting hole 902 such that the multi-faceted mounting structure 118 fits into the internal surface 904 of the mounting hole. When supported in this manner, the rear surface 110 of the sensing assembly 102 will particularly be in contact with the support platform 906 (by comparison, when the sensing assembly 802 is supported on the mounting bracket 900, a corresponding surface formed by portions of the base and housing portions 108, 104 would be in contact with the support platform). In addition to the support platform 906, the mounting bracket 900 further includes support gussets 908 extending between the support platform and a support surface 909 extending substantially perpendicularly with respect to the support platform. Although not always necessary, in the present embodiment, the support gussets 908 are provided to lend additional structural rigidity to the mounting bracket 900.

The mounting bracket 900 also includes multiple—in this case, four—mounting holes (three of which are shown) 910 by which bolts (not shown) extending through the mounting bracket can pass through the mounting bracket and be attached to a support structure such as a wall (also not shown). In the present example, two of the mounting holes 910 extend all of the way through the support platform 906, while two additional ones of the mounting holes merely extend through the support surface 909. Although this mounting hole arrangement corresponds to a pattern generally accepted by the industry, other mounting hole arrangements (including arrangements involving fewer or more than four holes) can be employed. Further, in still other embodiments, the features of the mounting bracket can be modified from that shown, and/or other fastening accessories can be utilized, to affix the mounting bracket to a support structure. Also, although in the present embodiment the mounting bracket 900 is made of a metal or plastic material, in other embodiments other materials can be utilized instead of or in addition to such materials.

It should be appreciated that the sensing assemblies 102, 802 and complementary mounting bracket 900 described above are advantageous in one or more respects. To begin, the use of the multi-faceted mounting structure 118 and mounting hole 902, plus the ability to reverse the orientation of the base and housing portions 108, 104 to achieve the sensing assemblies 102, 108 of FIGS. 7 and 8, allows for a high degree of freedom in assembling, mounting, and orienting sensing assembly components, particularly so that the sensing face/front surface 126 of the sensing assembly can take on a variety of positions/orientations. In the present embodiment, the eight facets of each of the multi-faceted mounting structure 118 and mounting hole 902 allow the sensor (sensing face/front surface 126) to be positioned in 8 different rotational orientations, each 45 degrees apart, when the sensing face directional orientation is perpendicular to the axis 806 extending through the mounting portion 112 as shown in FIG. 8. Further, the sensor (sensing face/front surface 126) can take on a ninth orientation if one reverses the base portion 108 relative to the housing portion 104 so that the sensing assembly 802 is converted into the sensing assembly 102 where the sensing face directional orientation is positioned along the central axis 114 extending through the mounting portion 112 as shown in FIGS. 1 and 7.

Further, while the multi-faceted mounting structure 118 is particularly suited for the mounting bracket 900 with the multi-faceted mounting hole 902, proper design of the multi-faceted mounting structure allows that structure to still be inserted into, and allows support of the sensing assemblies 102, 802 with respect to, other types of mounting brackets that do not have a multi-faceted mounting hole. In particular, assuming that the outer diameter 120 (see FIG. 1) of the mounting structure 118 is properly sized so as to not exceed a typically inner diameter of another mounting bracket having a circular orifice rather than a multi-faceted mounting hole, the mounting structure can still can fit within and be properly supported by such other mounting bracket with circular orifice. In particular, to the extent that many conventional mounting brackets have such circular orifices with a 22 mm diameter, assuming that the mounting structure 118 outer diameter 120 is 22 mm or less, then the sensing assemblies 102, 802 employing that mounting structure can still be used in conjunction those conventional mounting brackets in addition to the mounting bracket 900 (other sensing assemblies having a circular mounting structure suited for a conventional mounting bracket may not, however, be able to be mounted using the mounting bracket 900, since the cross-sectional area of the circular mounting structure may exceed the cross-sectional area of the octagonal hole of the mounting bracket).

A further advantage associated with the sensing assemblies 102, 802 is that assembly of the housing portion 104 and base portion 108, and reorientation of the housing portion relative to the base portion (that is, from the sensing assembly 102 to the sensing assembly 802 or vice versa) can be accomplished without using additional tools or components. For example, instead of using fasteners such as a pair of screws or hex bolts to secure the base portion to the housing portion, which would require not only the screws/bolts but also a tool (e.g., a screwdriver or hex wrench to tighten the screws/bolts), and possibly metal (e.g., brass) inserts within one of the base or housing portions to receive the screws/bolts, the use of the mounting structures 200, 202, 300, 302 and locking mechanisms 400 (involving the recessed dimple pockets 204 and dimples 314) allows for the base portion and housing portion to be assembled with one another simply by way of pressing those portions together and shifting them so that the two components are aligned and locked into place. Thus, the present arrangement is advantageous because it allows for assembly of sensing assembly components without the use of special fastening/assembly components or associated tools, and also allows for the assembly process (and reorientation of the base portion relative to the housing portion) to be performed in a simpler, easier, and faster manner.

Figure 10:
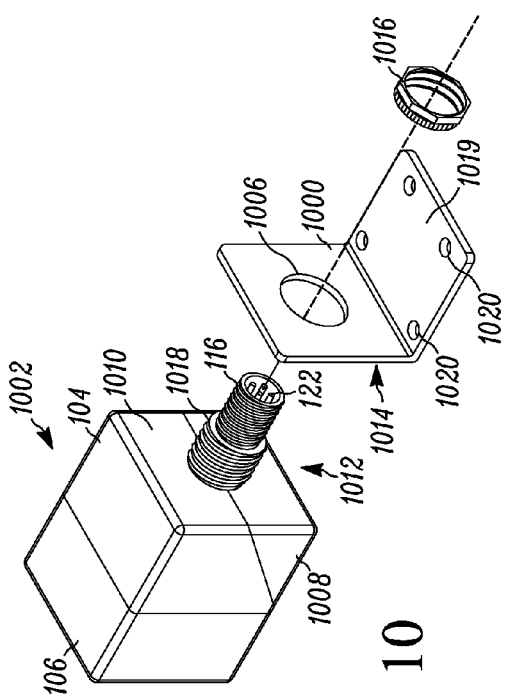
FIG. 10 is a perspective view of another example embodiment of a sensing assembly, differing from that of FIG. 1, along with mounting components that can be utilized to affix that sensing assembly in relation to a supporting structure (not shown), where the mounting components are shown to be disassembled from the sensing assembly.

Turning to FIG. 10, a further embodiment of a sensing assembly 1002 and complementary mounting bracket 1000 are shown (again, the sensing assembly and mounting bracket can together be considered a sensing assembly as well). In this embodiment, while the housing portion 104 (and cap 106) of the sensing assembly 1002 is the same as that of the sensing assemblies 102, 802, a base portion 1008 differing from the base portion 108 is employed. More particularly, the base portion 1008 includes a mounting portion 1012 that differs from the mounting portion 112 described above in that, while still including the threaded connector 116, instead employs a threaded mounting structure 1018 in place of the multi-faceted mounting structure 118. Complementing the use of the threaded mounting structure 1018, the mounting bracket 1000 has a receiving hole 1006 having a diameter equal to (or slightly exceeding) the outer (outermost) diameter of the threaded mounting structure 1018 so that the threaded mounting structure can pass through the receiving hole such that a rear surface 1010 of the sensing assembly 1002 is in contact with a support surface 1014 of the mounting bracket 1000. The mounting bracket 1000 can be made of a sheet metal such as stainless steel or nickel plated steel, for example.

Further as shown, the sensing assembly 1002 particularly can be coupled to (affixed to) the mounting bracket 1000 by way of a mounting nut (e.g., a hex nut) 1016 that is complementary in its threads to the threads of the threaded mounting structure 1018. When the threaded mounting structure 1018 is inserted through the receiving hole 1006, the mounting nut 1016 is tightened onto the threaded mounting structure until such time as the mounting nut abuts one side of the support surface 1014 and the rear surface 1010 is in contact with the other side of the support surface. The threaded mounting structure 1018 can be of any thread size including any thread size commonly used in the industry, such as 18 mm threads. The thread diameter of the threaded mounting structure 1018 can also be sized to correspond to the 22 mm mounting diameter of some conventional cubic (or rectangular) proximity sensor mounting brackets currently on the market to allow for backwards compatibility.

In addition to the support surface 1014, the mounting bracket 1000 additionally has a further surface 1019 extending substantially perpendicularly away from the support surface. Further, four mounting holes 1020 are provided through the further surface 1019 through which bolts or other fasteners can be inserted to allow for attachment of the mounting bracket 1000 to another support structure such as a wall (not shown). The mounting bracket 1000 in the present embodiment has four mounting holes arranged in a pattern generally accepted by the industry, although the number of mounting holes and their arrangement can vary depending upon the embodiment (and, indeed, other fastening devices or manners of fastening the mounting bracket to another support structure can be employed in other embodiments).

Figure 11:
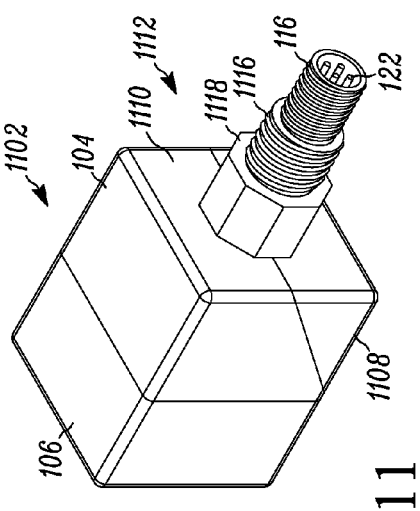
FIG. 11 is a perspective view of a further example embodiment of a sensing assembly, differing from those of FIGS. 1 and 10.

Referring next to FIG. 11, a perspective view of a further sensing assembly 1102 is provided. The further sensing assembly 1102 is similar to each of the sensing assemblies 102 and 1002 but represents a combination of the two. That is, the further sensing assembly 1102 continues to employ the housing portion 104 (and cap 106) but has a base portion 1108 having a mounting portion 1112 that includes not only the threaded connector 116 but also both a first multi-faceted mounting structure 1118 identical to or substantially identical to (e.g., in terms of its octagonal facets, diameter and axial length) the multi-faceted mounting structure 118 of the base portion 108, and also a threaded mounting structure 1116 identical to or substantially identical to (e.g., in terms of threading features, diameter, and axial length) the threaded mounting structure 1018 of the base portion 1008 of the sensing assembly 1002. Again, for example, the threaded mounting structure 1116 in particular can have any thread size commonly used in the industry, such as 18 mm threads. In the present example, the threaded mounting structure 1116 is positioned between the multi-faceted mounting structure 1118 and the threaded connector 116, while the multi-faceted mounting structure 1118 is positioned between the threaded mounting structure 1116 and a rear surface 1110 of the sensing assembly 1102.

Figure 12:
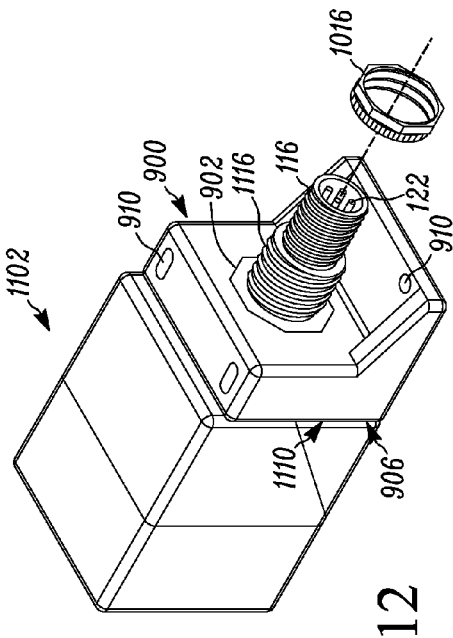
FIG. 12 is a perspective view of the mounting bracket of FIG. 9 in combination with the sensing assembly of FIG. 11 but not yet fully attached, along with a further mounting component (a nut) that can be used to fixedly attach the sensing assembly and mounting bracket.

Referring additionally to FIG. 12, the further sensing assembly 1102 of FIG. 11 is shown to be positioned in relation to the mounting bracket 900 of FIG. 9, particularly so that the support platform 906 of the mounting bracket is in contact with the rear surface 1110 of the sensing assembly. As shown, when positioned in this manner, the mounting portion 1112 extends through the multi-faceted mounting hole 902 of the mounting bracket 900 such that the octagonal facets of the multi-faceted mounting structure 1118 are positioned adjacent to the complementary facets of the internal surface 904 of the multi-faceted mounting hole. Additionally, given this position, the threaded connector 116 and threaded mounting structure 1116 extend outward beyond the support platform 906 of the mounting bracket 900 on the other side of that support platform opposite that which is in contact with the rear surface 1110 of the sensing assembly 1102. Given that the threaded mounting structure 1116 has the same threading features/diameter as the threaded mounting structure 1018 of FIG. 10, the mounting nut 1016 employed in the arrangement of FIG. 10 can also be used to secure the threaded mounting structure 1116 and sensing assembly 1102 in relation to the mounting bracket by threading the mounting nut onto the threaded mounting structure and tightening the mounting nut.

Figure 14:
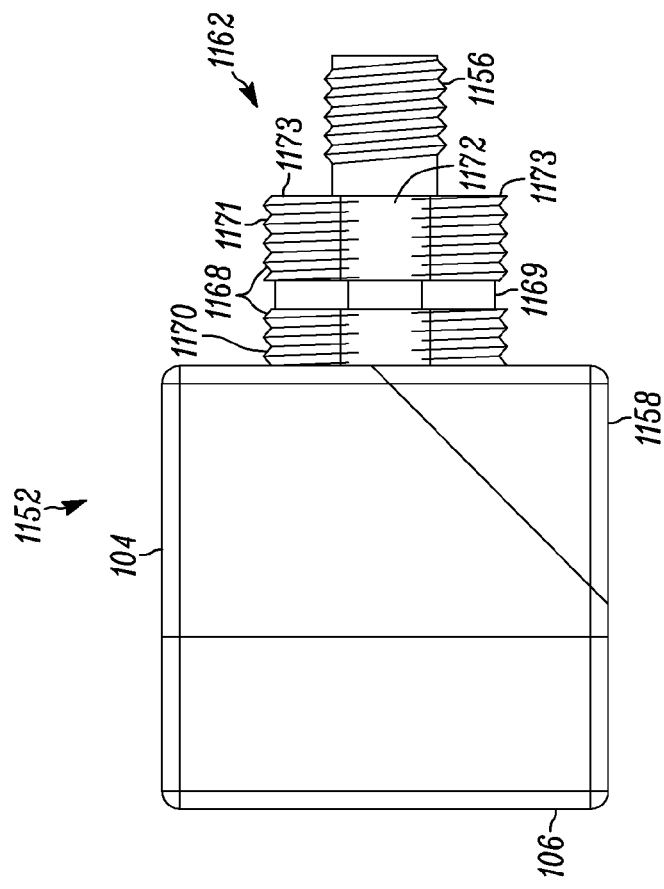
FIG. 14 is a side elevation view of the sensing assembly of FIG. 13.
Figure 13:
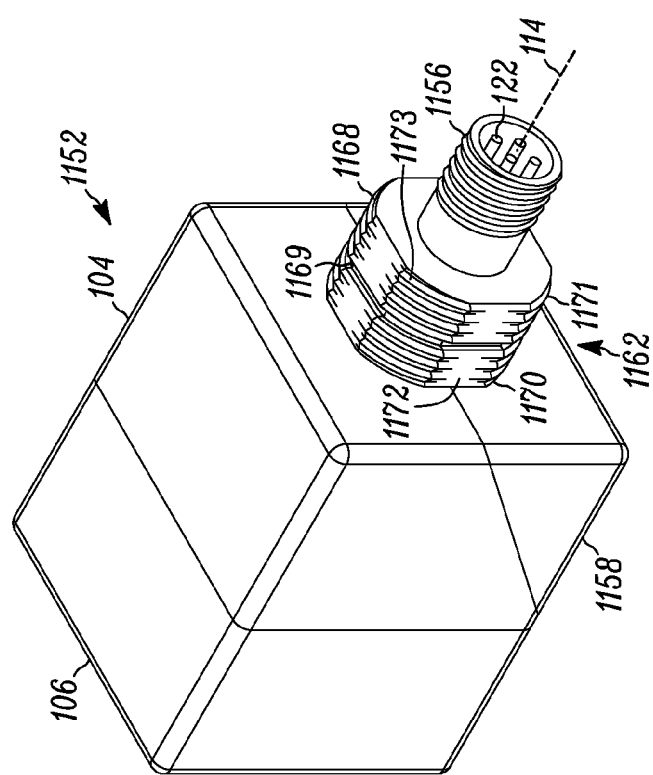
FIG. 13 is a perspective view of an additional example embodiment of a sensing assembly, differing from those of FIGS. 1, 10 and 11.

Referring next to FIGS. 13 and 14, respectively, perspective and side elevation views respectively of a further sensing assembly 1152 are provided. The further sensing assembly 1152 is similar to the sensing assembly 1002 of FIG. 10 (and includes the housing portion 104 with the cap 106 discussed above) except that, in contrast to that assembly, the further sensing assembly 1152 has a base portion 1158 (in place of the base portion 1008) with a mounting portion 1162 that is different in its features than the mounting portion 1012. In particular, while the mounting portion 1012 includes the threaded connector 116 and the threaded mounting structure 1018, the mounting portion 1162 instead includes a threaded connector 1156 and a threaded mounting structure 1168. The threaded connector 1156, although slightly different from the threaded connector 116 (e.g., because the threads are only at the end of the threaded connector rather than along its entire axial length), still has the pins 122 therewithal and, in other embodiments, can be identical to the threaded connector 116.

As for the threaded mounting structure 1168 of FIGS. 13-14, this structure differs from the threaded mounting structure 1018 of FIG. 10 in several manners. First, the threaded mounting structure 1168 has a recessed undercut 1169 spaced between first and second axial portions 1170 and 1171 of the mounting structure that are threaded, where the first axial portion 1170 is positioned axially along the central axis 114 adjacent to the housing portion 104 while the second axial portion 1171 is positioned axially farther down the central axis 114 and is the portion of the mounting structure from which the threaded connector 1156 extends. Additionally, while the threaded mounting structure 1018 is generally shaped in the form of a right circular cylinder, the threaded mounting structure 1168 instead has a quasi-octagonal shape in cross-section (as viewed in a plane perpendicular to the central axis 114). More particularly as shown, the threaded mounting structure 1168 particularly includes four flat sides or flats 1172 alternating with four rounded corner formations or rounds 1173. Each of the four flats 1172 in particular is positioned at a location about the central axis 114 that is 90 degrees apart from the location of the next successive one of the flats. Also, the four flats 1172 particularly form two pairs of the flats, with the flats of each pair being parallel to and positioned opposite one another about the central axis 114. Given this arrangement, cross-sectionally the threaded mounting structure 1168 is quasi-octagonal (rather than fully octagonal) in shape insofar as the flats 1172 are similar in shape and position to four corresponding facets/sides of the multi-faceted mounting structure 118 of FIG. 1, but the rounds 1173 extend in a convex manner outward beyond where the surfaces of the remaining four facets/sides of the multi-faceted mounting structure 118 are positioned. Further, it should be noted that while the rounds 1173 are threaded, the flats 1172 are only partly threaded (and needed not be threaded at all).

Given the arrangement of the threaded mounting structure 1168, the additional sensing assembly 1152 is particularly configured to be supported by a modified version of the mounting (support) bracket 900 shown in FIG. 9. More particularly, given the shape of the threaded mounting structure 1168 with the rounds 1173 and flats 1172, the mounting (support) bracket used in connection with this threaded mounting structure 1168 can be identical to the mounting (support) bracket 900 of FIG. 9 except insofar as the mounting hole within that bracket should, rather than being octagonal as is the mounting hole 902 of FIG. 9, be "quasi-octagonal" with facets that are alternatingly flat and rounded such that the mounting hole is complementary in shape relative to the shape of the threaded mounting structure 1168. It should be appreciated that, with such a design, and assuming an axial length of the threaded mounting structure 1168 that is sufficient so that at least a portion of that structure (e.g. the second axial portion 1171 or a part thereof, and possibly also the undercut 1169 or a portion thereof) extends outward beyond the support bracket in the manner illustrated in FIG. 12, it is therefore possible to affix a mounting nut such as the mounting nut 1016 discussed earlier onto the threaded mounting structure 1168 (or portion thereof protruding beyond the support bracket) so as to fasten the threaded mounting structure (and the entire sensing assembly 1152) to the support bracket. In particular, the rounds 1173 are curved in a manner so as to allow the mounting nut to be screwed onto the threaded mounting structure 1168. The particular mounting nut used can have an inner diameter (of its threads) that is identical or substantially identical to the outer diameter of the rounds 1173 (of the threads of the rounds) so that the mounting nut is complementary relative to the rounds.

Although the threaded mounting structure 1168 in the embodiment of FIGS. 13-14 is quasi-octagonal in shape, in alternate embodiments it can take other shapes as well. For example, in other alternate embodiments of a threaded mounting structure, three flats can be positioned in an alternating manner relative to three rounds, to form a quasi-hexagonal shape. In other embodiments, still other variations are possible. Indeed, any arbitrary number of flats and rounds can be present. For example, in still another embodiment, there is only a single flat and a single round, with the round extending most of the way around the central axis 114. Also, in some instances, the flats can be replaced with surfaces of other shapes. Typically, however, the flats or other shapes are recessed so as to not extend outward beyond a circumference corresponding to the threads of the rounds since, desirably, the round(s) of these embodiments are threaded and particularly accommodate attachment of a mounting nut/ring. Indeed, by including one or more (and at least one) flat that is recessed relative to the round(s) (or other shaped facet that is recessed relative to the rounds), the support bracket can be attached to the threaded mounting structure 1168 in a locked manner that prevents relative rotation of the support bracket and the mounting structure. Also, such designs can limit attachment of the threaded mounting structure to only those support brackets that have complementary mounting holes, thus preventing undesirable or unintended coupling of threaded mounting structures to support brackets that are not appropriate for supporting those threaded mounting structures (and vice-versa).

It should further be appreciated that, although the mounting nuts in the embodiments shown above (such as the mounting 1016) are configured and threaded so as to be coupled to portions of threaded mounting structures such as the threaded mounting structure 1116, 1018, and 1168 rather than the threaded connectors 116, 1156, in other embodiments it is also envisioned that mounting nuts can be employed that are configured and threaded so as to be coupled to the threaded connectors themselves for the purpose of securing the sensing assemblies of which those threaded connectors are a part to support brackets or other mounting structures. In particular, assuming that the threaded connectors are of sufficient length, a mounting nut can be screwed onto the threaded connector of a sensing assembly fully so as to lock the sensing assembly in place relative to a support bracket extending between the mounting nut and remainder of the sensing assembly, and then also an electrical connector (e.g., a cable) can further be screwed onto the threaded connector (at a location at or more proximate to the tip of the threaded connector) to allow for a desired electrical connection to be achieved by way of coupling that electrical connector to the electrical connector portion(s) (e.g., the pins) of the threaded connector.

Referring next to FIG. 15, an additional sensing assembly 1302 is shown that again employs the housing portion 104 (and cap 106). The sensing assembly 1302 additionally includes a base portion 1308 having a mounting portion 1312 that, while including the threaded connector 116, nevertheless differs somewhat from the mounting portion 112 of the base 108 of the sensing assembly 102. More particularly as shown, while the mounting portion 1312, like the mounting portion 112, includes a multi-faceted (in this example, octagonal) mounting structure 1318 similar to the multi-faceted mounting structure 118 of FIG. 1, the multi-faceted mounting structure 1318 additionally includes two arrow shaped snaps 1320 that are built into and extend outward from the multi-faceted mounting structure along (but spaced from) the threaded connector 116, in a direction parallel to a central axis 1314 of the sensing assembly 1302. As shown, the snaps 1320 are located on opposite sides of the multi-faceted mounting structure 1318 and each face outward such that respective ramped snap face portions 1322 of the snaps are located on the outer (rather than inner) surfaces of the snaps 1320. While the snaps 1320 extend outward from two respective facets of the multi-faceted mounting structure 1318, gaps 1324 are formed along portions of the snaps 1320 between the snaps and that mounting structure, allowing the snaps to flex radially inward toward the central axis 1314 when inwardly-directed radial pressure is applied to the ramped snap face portions 1322.

Referring additionally to FIG. 16, the sensing assembly 1302 is shown to be positioned in relation to, and affixed to, the mounting bracket 900 of FIG. 9. In particular, while the multi-faceted mounting structure 1318 is positioned within the multi-faceted mounting hole 902 such that a rear surface 1310 of the sensing assembly 1302 is in contact with the support platform 906 of the mounting bracket, both the threaded connector 116 and the ramped snap face portions 1322 of the snaps 1320 are shown to extend out of the multi-faceted mounting hole beyond the support platform 906 of the mounting bracket. In particular, it will be understood that during insertion of the mounting portion 1312 through the multi-faceted mounting hole 902, outer surfaces of the ramped snap face portions 1322 come into contact with the internal surface 904 of that mounting hole and are pressed inwardly toward the central axis 1314 until the ramped snap face portions exit the mounting hole.

Upon the ramped snap face portions exiting the multi-faceted mounting hole 902, those snap face portions (and the snaps 1320) snap outwardly away from the central axis 1314 such that outer portions of those snap face portions overhang the mounting bracket support platform 906 such that the snap face portions cannot be pulled back out through the multi-faceted mounting hole 902. That is, after the ramped snap face portions 1322 have passed through the mounting hole 902 in the bracket 900, the snaps 1320 spring outward to allow the ramped snap face portions to secure the sensing assembly 1302 to the bracket. Thus, at that point, the snaps 1320 and thereby the entire sensing assembly 1302 is locked in place relative to the mounting bracket 900. Further, in order for the sensing assembly 1302 to be released from the mounting bracket 900, the ramped snap face portions 1322 need to be pressed inwardly toward the central axis 1314 (and toward one another) to release the snaps relative to the mounting bracket 900, such that the mounting portion 1312 including the snaps 1320 can be pulled back out through the multi-faceted mounting hole. The use of the snaps 1320 thus provide a fast and convenient mechanism for installation and removal of the sensing assembly 1302 relative to the mounting bracket 900 without the need for additional tools or fastening devices.

Although not discussed above in detail, it should be evident that the sensing assemblies 1002, 1102, and 1302 shown in FIGS. 10, 11, and 15, respectively, although having the respective base portions 1008, 1108, and 1308 that each differ from the base portion 108 of FIG. 1, nevertheless can and in the present embodiments do include the coupling mechanisms discussed with respect to FIGS. 1-8 by which the base portions are coupled to the housing portion 104 of those sensing assemblies. Thus, in each of those embodiments, the base portions 1008, 1108, and 1308 can achieve the same benefits as the base portion 108 in terms of being capable of attachment and reorientation relative to the housing portion 104 in the multiple manners illustrated in FIGS. 5-8.

Turning next to FIGS. 17-19, although in some embodiments the threaded connector (e.g., the threaded connector 116 of FIG. 1) is fixedly attached to the remainder of the base portion (e.g., the base portion 108) and/or the remainder of the mounting portion to which the threaded connector is attached (e.g., the mounting structure 118 of the mounting portion 112), in other embodiments the threaded connector is rotatable relative to the base portion and/or other portion(s) of the mounting portion. FIG. 17 in particular shows a cross-sectional view of a sensing assembly 1502 that is identical to the sensing assembly 102 of FIG. 1 except insofar as, in this sensing assembly, a threaded connector 1516 (having the pins 122) is rotatable relative to the remainder of a mounting portion 1512 extending from a base portion 1508 of the sensing assembly (the housing portion 104 can again be used in this sensing assembly). FIG. 18 additionally shows the threaded connector 1516 when removed from the remainder of the base portion 1508/mounting portion 1512, while FIG. 19 shows a perspective view of the base portion 1508 without the threaded connector 1516 present therein. It should be noted that the particular cross-section shown in FIG. 17 is a cross-section taken along a plane perpendicular to the outer side surfaces of the housing portion (e.g., perpendicular to the surfaces 134 and 136 of FIG. 1), where the plane is coincident with a central axis 1517 of the sensing assembly 1502 (e.g., the central axis corresponding to the central axis 114 of FIG. 1), and the cross-sectional view is only provided from the tip of the mounting portion 1512 (the threaded connector 1516) inward to a cutaway line 1519 proximate the junction between the mounting portion and the housing portion 104.

Although it is desired in the embodiment of FIGS. 17-19 that the threaded connector 1516 be rotatable, it is still desired that the threaded connector be retained axially within the remainder of the mounting portion 1512 that is, with respect to a multi-faceted mounting structure 1518 of the mounting portion. To achieve this purpose, snaps 1520 with flat end faces (heads) 1522 are built into the base portion 1508, and particularly extend axially within the multi-faceted mounting structure 1518. The snaps 1520 more particularly are built into an annular wall 1506 (see FIG. 19) protruding inwardly from the end of the multi-faceted mounting structure 1518 toward the main body of the base portion 1508. Additionally, a circumferential groove 1524 and adjacent circumferential rim 1525 are formed adjacent to one another along the outer surface of the threaded connector 1516, axially midway between threads 1526 formed at one end of the threaded connector (the end from which the pins 122 are accessible) and the other end of the threaded connector that is to be retained within the multi-faceted mounting structure 1518. The circumferential rim 1525 particularly is closer to the threads 1526 than the circumferential groove 1524.

Given this arrangement, when the threaded connector 1516 is pressed through the multi-faceted mounting structure 1518 (in a direction outward from the main body of the base portion 1508 that is intended to engage the housing portion 104, through the multi-faceted mounting structure as represented by an arrow head 1521 shown in FIG. 19), the circumferential rim 1525 passes along the radially inwardly-facing surfaces of the snaps 1520 until it passes the flat end faces 1522. At this point, the snaps 1520 snap radially inwardly to fit into the circumferential groove 1524, while the circumferential rim 1525 is locked axially in place between the flat end faces 1522 and a radially inwardly-extending annular lip or shelf 1528 formed at the end of the multi-faceted mounting structure 1518. When installed in the multi-faceted mounting structure 1518 shown in FIG. 19, the circumferential rim 1525 particularly sits on the shelf 1528 to keep the threaded connector 1516 from proceeding (falling) out through the end of that mounting structure. Further as shown in FIG. 17, openings 1530 in/at the end of the multi-faceted mounting structure 1518 are provided to be able to mold the snaps 1520. It should be further noted that, as shown in FIG. 17, a pocket 1532 in the back of the threaded connector 1516 (proximate the end of the threaded connector opposite the end having the threads 1526) is filled with epoxy potting to seal soldered connections 1534 between the cable 514 and the connector pins 122.

Referring particularly to FIGS. 18 and 19, additional features are provided on the threaded connector 1516 and the base portion 1508 such that, although the threaded connector is able to rotate about the central axis 1517 relative to the base portion, it is not able to rotate more than 360 degrees. This is desirable to limit the degree of twisting experienced by the cable 514 (and possibly any external connector to which threaded connector is linked). Particularly in this regard, as shown in FIG. 18 (and also FIG. 17), the threaded connector 1516 has a protrusion 1602 at its end opposite the end on which are provided the threads 1526 (that is, the protrusion 1602 is at the end of the threaded connector that interfaces the multi-faceted mounting structure 1518). Complementarily, as shown in FIG. 19, a protrusion 1702 extending upwards and radially outwards from the top of the annular wall 1506 is also provided, where the top of the annular wall is the axially-innermost portion of the annular wall that is closest to the housing portion 104 when the housing portion 104 and base portion 1508 are assembled. Given the protrusions, 1602, 1702, when the threaded connector 1516 is fully inserted into the multi-faceted mounting structure 1518, the protrusion 1602 rests upon the top of the annular wall 1506. When so positioned, the threaded connector 1516 is free to rotate (in either clockwise or counterclockwise directions) up to but not beyond rotational positions at which the protrusion 1602 engages the protrusion 1702, which limits the rotation of the threaded connector to a maximum of 360 degrees (more accurately, to slightly less than 360 degrees).

Figure 21:
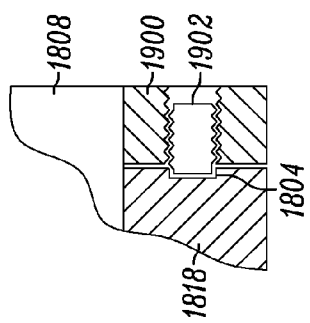
FIG. 21 is a cross-sectional cutaway view of a portion of the sensing assembly of FIG. 20 in relation to a portion of a mounting bracket.
Figure 20:
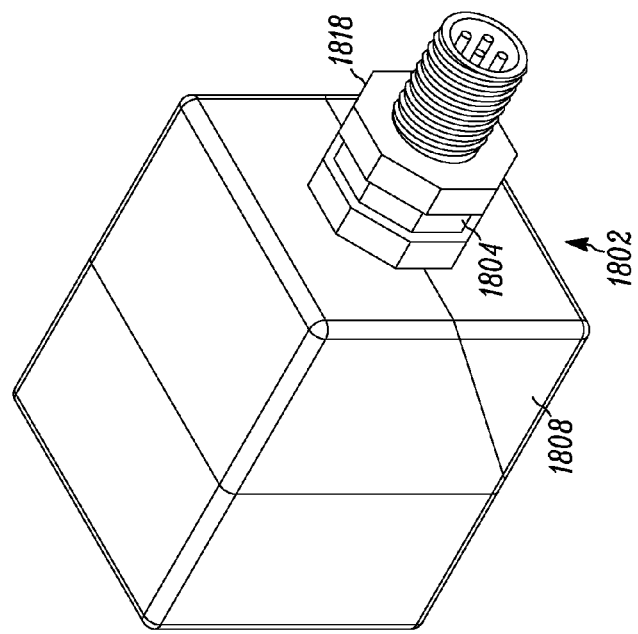
FIG. 20 is a perspective view of yet another example sensing assembly.

As already discussed, sensing assemblies such as those described above can be affixed to mounting brackets in a variety of manners. Turning now to FIGS. 20-21, in at least some embodiments, a number of the multi-faceted mounting structures discussed above (e.g., the mounting structures 118 and 1118 discussed above) can also be modified to incorporate an undercut (multi-faceted or round) to receive a fastening or securing mechanism, such as a set screw. Such an undercut can take a form that is similar or identical to that of the undercut 1169 of FIGS. 13-14. Further in this regard, FIG. 20 in particular shows a sensing assembly 1802 that is identical to the sensing assembly 102 except insofar a base portion 1808 of the sensing assembly includes an undercut 1804 (or groove) formed around a multi-faceted mounting structure 1818 of that base portion. As was the case with the sensing assembly 1152 of FIGS. 13 and 14, the undercut in this embodiment is axially midway along the mounting structure 1818. FIG. 21 provides a further cross-sectional cut-away view of the multi-faceted mounting structure 1818/base portion 1808 of the sensing assembly 1802 mounted in relation to a mounting bracket 1900 that is identical to the mounting bracket 900 of FIG. 9 except insofar as it includes a set screw 1902 extending through the mounting bracket and into the undercut 1804 of the multi-faceted mounting structure. By virtue of the positioning of the set screw 1902, the multi-faceted mounting structure 1818, base portion 1808 and sensing assembly 1802 are locked in place relative to the mounting bracket 1900. Unscrewing of the set screw 1902 out of the undercut 1804 correspondingly will allow disassembly of the mounting bracket 1900 from the sensing assembly 1802. It should be appreciated that both the set screw 1902 and mounting nuts such as the mounting nut 1016 are threaded structures that can (depending upon the embodiment) be employed to secure sensing assembly components in relation to support brackets or the like.

Notwithstanding the description provided above regarding the manner in which base portions such as the base portion 108 can be coupled/locked in relation to a housing portion such as the housing portion 104 of a sensing assembly, numerous other arrangements are possible as well. FIGS. 22-26 illustrate some additional such locking arrangements. In each of these embodiments, it should be apparent that (as with the earlier-described embodiments) a base portion of the sensing assembly can be assembled to a housing portion of the sensing assembly in one of two different orientations that differ from one another by 180 degrees about an axis perpendicular to mating surfaces of those housing and base portions.

Figure 22:
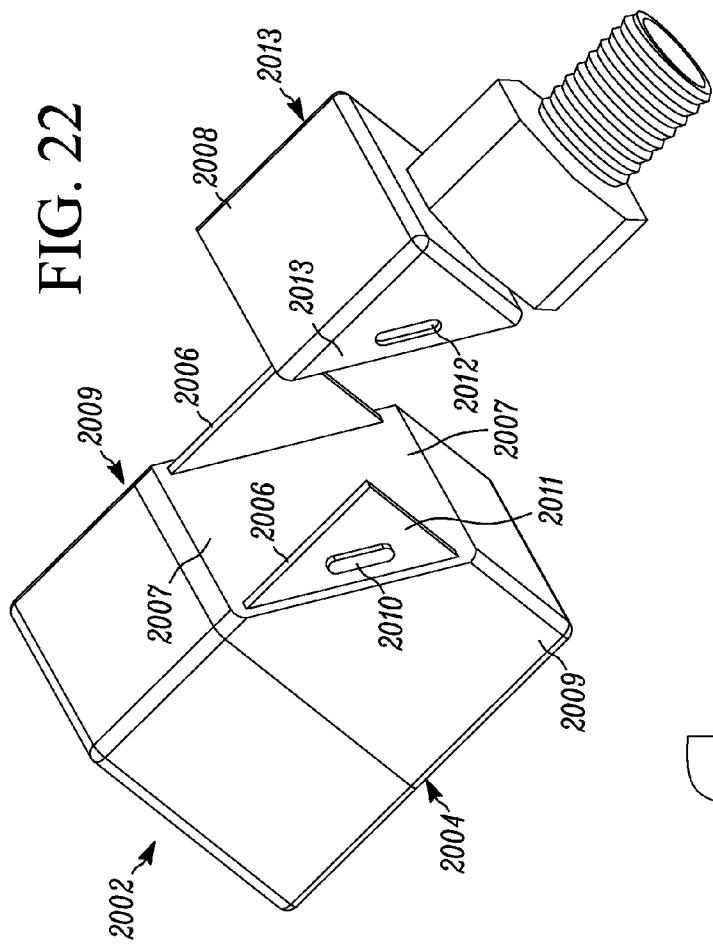
FIGS. 22-25 are perspective exploded views of other example sensing assemblies employing various mechanisms for attaching base portions of those sensing assemblies in relation to housing portions of those sensing assemblies that are different from a mechanism used in the sensing assembly of FIGS. 1-8.

With respect to FIG. 22, for example, components of another sensing assembly 2002 include a housing portion 2004 and a base portion 2008. The housing portion 2004 of the sensing assembly 2002 includes two fins 2006 that protrude from the main body of the housing portion, away from a 45-degree-angle mating surface 2007 of the housing portion that corresponds to the mating surface 128 of FIG. 1. In this embodiment, the two fins 2006 in particular extend in directions substantially parallel to side surfaces 2009 of the housing 2004, but are positioned slightly inwards of those side surfaces (that is, inwardly toward one another). Locking protrusions (one of which is shown) 2010 extend outwards from outer side surfaces 2011 (again one of which is shown) of the fins 2006. The locking protrusions 2010 can have a variety of shapes such as, for example, that of a rounded rectangle as shown. The locking protrusions 2010 are configured to mate with complementary holes (one of which is shown) 2012 located in side walls 2013 of the base portion 2008 of the sensing assembly. The side walls 2013 of the base portion 2008 can flex to receive the locking protrusions 2010. When assembled, the fins 2006 protruding from the housing portion 2004 are inside the base portion 2008.

Figure 23:
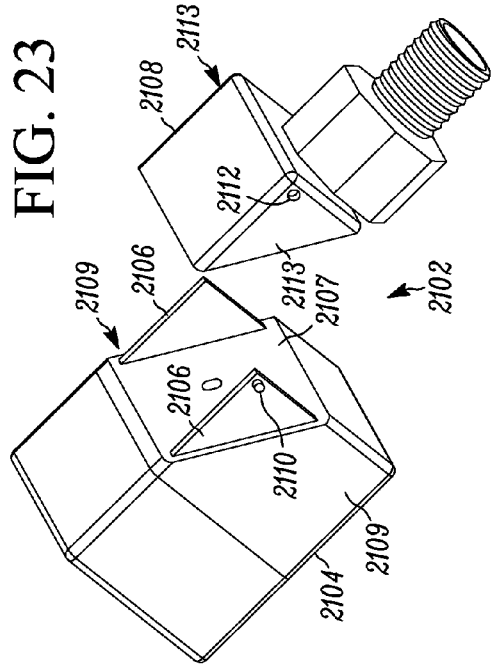

Turning to FIG. 23, an additional sensing assembly 2102 employs another exemplary locking mechanism. The sensing assembly 2102 is identical to the sensing assembly 2002 of FIG. 22 in that it again employs on a housing portion 2104 two fins 2106 (extending from a 45-degree-angle mating surface 2107) with locking protrusions 2110 that are configured to engage complementary holes 2112 within side walls 2113 of a base portion 2108. As with the embodiment of FIG. 22, the fins 2106 are positioned slightly inwardly of side surfaces 2109 of the housing portion 2104. In contrast to the sensing assembly 2002, however, in the sensing assembly 2102 the locking protrusions 2110 are spherical protrusions that extend outwards from the fins 2106, and the complementary holes 2112 located in the side walls 2113 are round holes. Again, the fins 2106 protruding from the housing portion 2104 can flex to allow the spherical locking protrusions 2110 to fit into the holes 2112 in the base portion 2108. When the sensing assembly 2102 is fully assembled, the fins 2106 protruding from the housing portion 2104 are inside the base portion 2108.

Figure 24:
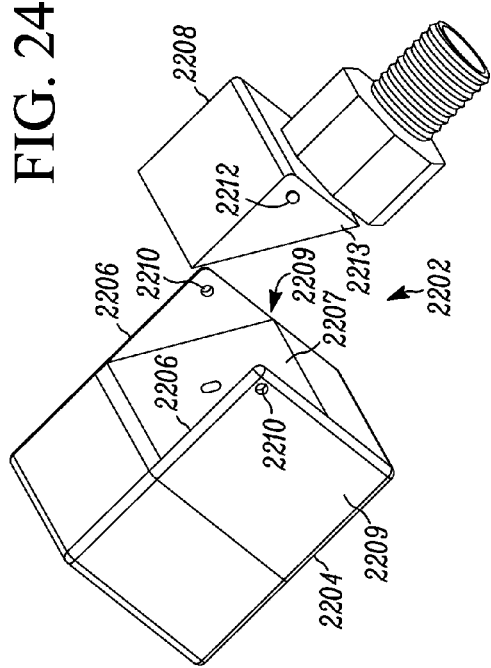

Turning next to FIG. 24, another sensing assembly 2202 having another exemplary locking mechanism is shown. In this embodiment, two fins 2206 protrude from a 45-degree-angle mating surface 2207 of a housing portion 2204 and are not only parallel to but coincident with and extensions of exterior side surfaces 2209 of the housing portion. In this embodiment, holes 2210 are located in the fins 2206 to accept complimentary protrusions (one of which is shown) 2212 that extend outwards from side surfaces (one of which is shown) 2213 of a base portion 2208. The holes 2210 and protrusions 2212 can have a variety of shapes depending upon the embodiment, and in the present embodiment both are round (e.g., the protrusions can be spherical or cylindrical). In this embodiment, the fins 2206 protruding from the housing portion 2204 can flex to allow the protrusions 2212 to fit into the holes 2210 in the fins 2206. When assembled, the base portion 2208 fits between the fins 2206.

Figure 26:
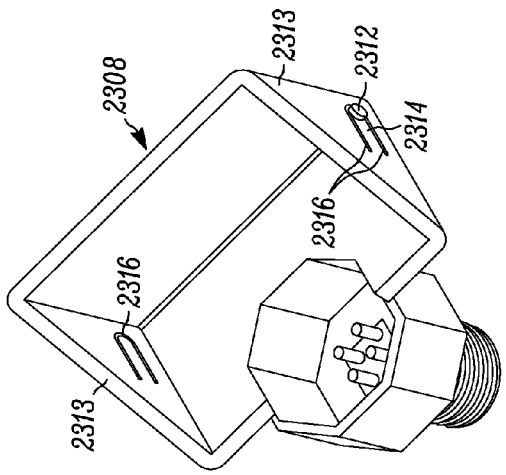
FIG. 26 is a further perspective view of the base portion of the sensing assembly of FIG. 25.
Figure 25:
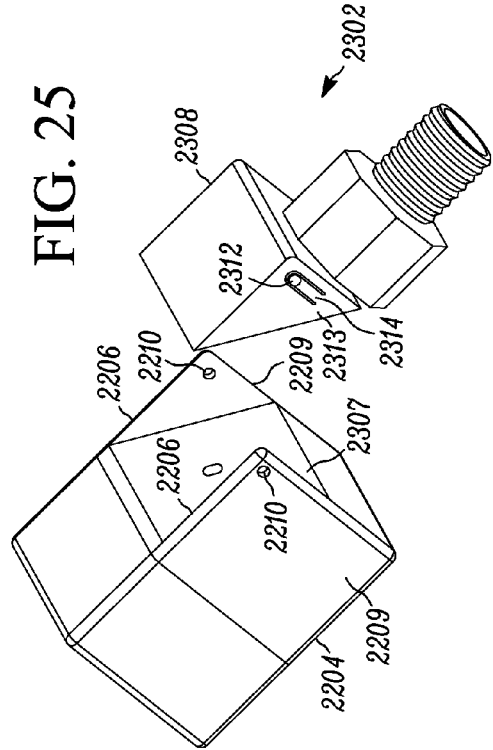

Referring to FIGS. 25-26, a further example sensing assembly 2302 is shown employing another exemplary locking mechanism. FIG. 25 shows both the housing portion of the sensing assembly 2302, which again is the housing portion 2204 of FIG. 24, and a base portion 2308 of the sensing assembly. FIG. 26 shows the base portion 2308 again in more detail from a different perspective view. As shown in FIG. 25, again the two fins 2206 protrude from the main body of the housing portion 2204 along the exterior side surfaces 2209 and include the holes 2210, which again are located in the fins to accept complimentary protrusions 2312 formed on the base portion 2308. However, in contrast to the embodiment of FIG. 24, in FIGS. 25 and 26 the complementary protrusions 2312 formed on the base portion 2308 are formed on snaps 2314 that are formed in the base portion. As shown, the snaps 2314 particularly are elongated extensions formed within side walls 2313 of the base portion 2308, where one end of each snap is integral with the remainder of the side wall in which it is formed and the snap extends from that one end, separated from the rest of the side wall along the remainder of the length of the snap, by way of cuts 2316.

The protrusions 2312 are formed on the snaps 2314 at their far ends, opposite the ends that are integral with the remainders of the respective sidewalls 2313. Again, the holes 2210 and protrusions 2312 that extend from the snaps 2314 can have a variety of shapes, and in the present embodiment are shown to be round (or spherical or cylindrical in the case of the protrusions). Given the presence of the flexible snaps 2314 in the sensing assembly 2302, the fins 2206 protruding from the housing portion 2204 (and also the sidewalls 2313 of the base portion 2308 aside from the snaps) can be made rigid to prevent flexing. That is, it is the snaps 2314 in the sidewalls 2313 of the base portion 2308 that can flex to allow the raised protrusions 2312 at the far ends of the snaps to engage with the holes 2210 in the housing fins 2206. As with the embodiment of FIG. 24, when assembled, the base portion 2308 of the sensing assembly 2302 fits between the fins 2206. Also, although the holes 2012, 2112, and 2210 of FIGS. 22-25 are shown to extend fully through the walls in which the holes are formed, in alternate embodiments, the holes need not extend all of the way through the walls but rather can simply be indentations formed in the wall surfaces that receive the complementary protrusions.

Further with respect to the embodiments shown in FIGS. 22-26, in at least some such embodiments or some contexts, surfaces or edges of the base portions 2008, 2108, 2208, and 2308 can still be considered mating surfaces that are in contact with, and complement, the mating surfaces 2007, 2107, 2207, and 2307 of the corresponding housing portions 2004, 2104, 2204, and 2304, respectively. For example, with respect to the embodiment of FIG. 22, when the housing portion 2004 and base portion 2008 are fully assembled, in at least some circumstances, surfaces or surface portions (e.g., simply the edges of the side walls 2013) of the base portion 2008 are in contact with the mating surface 2007. In such contexts, these surfaces or surface portions of the base portion 2008 can also be considered mating surfaces that complement the mating surface 2007.

Notwithstanding the particular embodiments described above and shown in FIGS. 1-26, it should be understood that the present invention is intended to encompass numerous other embodiments in addition to those specifically described and shown. For example, numerous component parts shown herein can be modified to have different shapes or sizes, and/or can be reversed in position relative to other component parts to achieve similar locking or complementary operations. Also, one or more component parts shown in one more of the sensing assemblies or sensing assembly components (including mounting brackets) can be combined in other manners besides those specifically described and shown. It is to be understood that other embodiments would be evident based on the present disclosure, and that system, process, or mechanical changes can be made without departing from the scope of the present invention.

Likewise, the drawings showing embodiments of the system, assembly and/or method are semi-diagrammatic and not necessarily to scale. Similarly, although some of the views in the drawings for ease of description often show similar orientations, this depiction in the FIGS. is arbitrary for the most part. Generally, embodiments of the invention can be operated in any orientation. Terms, such as "front", "rear" "on", "above", "below", "bottom", "top", "side" (as in "sidewall"), and the like are typically defined with respect to the orientation of the sensing assembly and sensing assembly housings as they are illustrated, and are intended to facilitate a full understanding of at least some embodiments of the invention. However, these and similar terms should be interpreted in a broad and non-limiting sense.

Therefore, it is specifically intended that the present invention not be limited to the embodiments and illustrations contained herein, but include modified forms of those embodiments including portions of the embodiments and combinations of elements of different embodiments as come within the scope of the following claims.

We claim:

1. A sensing assembly comprising:
a housing portion including a primary mating face;
a base portion including a secondary mating face;
at least one first retaining structure provided in relation to a first of the primary and secondary mating faces; and
at least one second retaining structure provided in relation to a second of the primary and secondary mating faces;
wherein the at least one first retaining structure and at least one second retaining structure are configured to engage one another so as to at least partly retain the housing and base portions together, upon the primary and secondary mating faces being positioned adjacent to one another along a junction and shifted relative to one another along the junction,
wherein the base portion when assembled in relation to the housing portion can have either of a first orientation and a second orientation that is rotated 180 degrees relative to the first orientation about an axis extending perpendicular to the junction, and
wherein a mounting portion of the sensing assembly is configured to protrude outward from the sensing assembly in a manner that is substantially diametrically opposed to a directional orientation of a sensing face of the sensing assembly when the base portion takes on the first orientation and configured to protrude outward from the sensing assembly in a manner that is substantially perpendicular to the directional orientation of the sensing face when the base portion takes on the second orientation.

2. The sensing assembly of claim 1, wherein the at least one first retaining structure protrudes from the first of the primary and secondary mating faces.

3. The sensing assembly of claim 1, wherein the at least one first retaining structure includes two protruding structures that each have a first dovetail-type form, and wherein the at least one second retaining structure includes two additional structures that each have a second dovetail-type form, the first and second dovetail-type forms being substantially complementary.

4. The sensing assembly of claim 3, wherein the two protruding structures are positioned at intermediate locations along the first mating face, wherein the two additional structures are positioned proximate a first side of the second mating face, and wherein two further recesses are provided between the respective two additional structures and a second side of the second mating face, whereby when the primary and secondary mating faces are first positioned adjacent to one another along the junction the two protruding structures are first positioned within the two further recesses and subsequently engage the two additional structures as the mating faces are shifted relative to one another along the junction.

5. The sensing assembly of claim 1, wherein at least one protrusion is formed on one of the mating faces and at least one complementary recess is formed on the other of the mating faces, and wherein upon the primary and secondary mating faces being shifted relative to one another along the junction so as to align the base and housing portions, each of the at least one protrusion fits into or otherwise engages a respective one of the at least one complementary recess so as to restrict the base and housing portions from experiencing further shifting.

6. A sensing assembly comprising:
a main body including at least a housing portion;
a mounting portion protruding outward from an outer surface of the main body,
wherein the mounting portion includes an outer connector section that is threaded and including at least one electrical connector, and further includes an intermediate section that includes an outer surface that either has substantially a shape of a polygon or is at least partly threaded, wherein the intermediate section is positioned in between the main body and the outer connector section,
wherein the intermediate section has an intermediate section outer diameter, the outer connector section has an outer connector section outer diameter, and wherein the intermediate section outer diameter is greater than the outer connection section outer diameter, and
wherein the outer surface of the main body has a dimension that is greater than the intermediate section outer diameter.

7. The sensing assembly of claim 6, wherein the intermediate section is a multi-faceted mounting structure section and the outer surface of the intermediate section has either an octagonal or hexagonal shape.

8. The sensing assembly of claim 7, further comprising an additional section in between the intermediate section and the outer connector section, wherein the additional section is threaded and has a further diameter that is less than the intermediate section outer diameter but greater than the outer connector section outer diameter.

9. The sensing assembly of claim 6, wherein the intermediate section includes a multi-faceted mounting structure section including the outer surface, wherein the outer surface of the intermediate section has one or more flat surfaces and one or more rounded surfaces, wherein the flat and round surfaces are positioned relative to one another in an alternating manner, and wherein each of the one or more rounded surfaces is threaded.

10. The sensing assembly of claim 9, wherein the one or more flat surfaces includes four of the flat surfaces, wherein the one or more rounded surfaces includes four of the rounded surfaces, and wherein the flat and rounded surfaces are arranged such that the outer surface has a quasi-octagonal shape, and wherein the outer connector section forms an end tip section of the mounting portion.

11. A combination of the sensing assembly of claim 6 and a mounting bracket, wherein the mounting bracket includes an orifice having an internal surface, the mounting portion being inserted into so as to extend at least partly through the orifice.

12. The combination of claim 11, wherein the orifice is substantially complementary in shape to at least one portion of the mounting portion.

13. The combination of claim 11, wherein a set screw is provided that extends through the mounting bracket and into a recess in the outer surface of the intermediate section, whereby the sensing assembly is locked in place relative to the mounting bracket.

14. The combination of claim 11, wherein snaps extend from the outer surface and protrude out through the orifice when the mounting portion is inserted into the orifice, and wherein the snaps allow for locking of the sensing assembly relative to the mounting bracket.

15. The combination of claim 11, further comprising a fastener, wherein the outer surface is at least partly threaded, and wherein the fastener is tightened onto the intermediate section when the intermediate section of the mounting portion is positioned to protrude through the orifice so as to lock the sensing assembly in place relative to the mounting bracket.

16. The combination of claim 15, wherein the intermediate section includes one or more flat surfaces and one or more rounded surfaces, the rounded surfaces being threaded, and wherein the fastener is tightened onto the intermediate section due to interaction between the one or more rounded surfaces and complementary threads of the fastener.

17. The combination of claim 11, wherein the mounting portion further includes an additional section positioned between the main body and the intermediate section, the additional section having a multi-faceted outer surface, and wherein the multi-faceted outer surface fits within a complementary multi-faceted inner surface defining the orifice of the mounting bracket when the mounting portion is positioned so as to extend at least partly through the orifice.

18. The sensing assembly of claim 6, wherein the outer connector section can be snapped into place axially relative to a remainder of the mounting portion, wherein the outer connector section is rotatable relative to the remainder of the mounting portion, and wherein a maximum rotation of the outer connector is limited to no more than 360 degrees of rotation.

19. The sensing assembly of claim 6, wherein the main body includes a base portion in addition to the housing portion, wherein the mounting portion is formed as part of the base portion, and wherein the base portion and housing portion are able to be assembled to one another along respective mating surfaces of the respective portions.

20. The sensing assembly of claim 19, wherein a pair of fins extend from the mating surface of the housing portion, and wherein one or more protrusions or recesses formed on the fins are able to engage one or more complementary recesses or protrusions formed on side surfaces of the base portion so as to lock the base portion in relation to the housing portion.

21. The sensing assembly of claim 19, wherein each of the base portion and the housing portion has a respective retaining structure provided in relation to the respective mating face of the respective portion, and wherein the respective retaining structures of the respective portions are configured to engage one another so as to at least partly retain the housing and base portions together, upon the primary and secondary mating faces being positioned adjacent to one another along a junction and shifted relative to one another along the junction.

22. The sensing assembly of claim 6, further comprising means for sensing one or more light, radiation, or heat.

23. A method of assembly comprising:
providing a housing portion of a sensing assembly, the housing portion including a primary mating face;
providing a base portion of the sensing assembly, the base portion including a secondary mating face and also a mounting portion protruding outward from a main body of the base portion;
wherein a first of the primary and secondary mating faces includes a first retaining structure protruding therefrom, and a second of the primary and secondary mating faces includes a second retaining structure protruding therefrom; and
assembling the housing portion to the base portion by arranging the housing portion in relation to the base portion so that the primary and secondary mating faces are adjacent to one another along a junction and so that the first and second retaining structures are engaged with one another,
wherein the mating surfaces are in contact with one another along the junction, and the junction extends along a plane that passes through a central axis of the sensing assembly along a 45 degree angle;
wherein the assembling further comprises: positioning the housing portion in relation to the base portion or the base portion in relation to the housing portion so that a first portion of the primary mating face and a second portion of the secondary mating face are adjacent to one another along the junction; and shifting the housing portion in relation to the base portion or the base portion in relation to the housing portion, in a direction substantially parallel to the junction, so that the first and second retaining structures are engaged with one another.

24. The method of claim 23, wherein as a result of the shifting, a protrusion associated with one of the base portion and the housing portion engages a recess associated with the other of the base portion and the housing portion.

25. The method of claim 23, wherein the assembling includes moving one or both of the base portion and housing portion in relation to one another so that the a fin or wall extension protruding from the primary mating face passes alongside a corresponding wall of the base portion until a protrusion associated with one of the base portion and housing portion engages a recess associated with the other of the base portion and the housing and, correspondingly, an edge of the wall of the base portion forming the secondary mating face is adjacent to the primary mating face of the housing portion.

26. The method of assembly of claim 23, wherein the mounting portion includes an outer connector section including at least one electrical connector, and further includes an intermediate section that includes an outer surface that either has a shape that is substantially that of a polygon or is at least partly threaded, the method further comprising:
further assembling the mounting portion of the sensing assembly in relation to a support bracket having an orifice by positioning the intermediate section into the orifice.

27. The method of claim 26, wherein a directional orientation of a face of the housing portion can be adjusted either (a) by repositioning the intermediate section to have a different rotational orientation relative to the orifice, or (b) by disassembling and reassembling the base portion and the housing portion in relation to one another such that the base portion takes on a new position relative to the housing portion that is rotated 180 degrees relative to an initial position attained subsequent due to the assembling.

28. The method of claim 26, further comprising:
providing a means for fastening; and
rotating or snapping the means for fastening in relation to one or both of the mounting portion and the support bracket, whereby the mounting portion becomes secured in relation to the support bracket.

29. The method of claim 26, further comprising additionally assembling the outer connector section to the intermediate section by inserting the outer connector section through an opening in the intermediate section until one or both of a rim or a channel extending around the outer connector section becomes engaged in relation to a formation of the intermediate section.

30. The method of claim 23, further comprising operating the sensing assembly to detect light or radiation subsequent to the assembling.

31. The sensing assembly of claim 19, wherein the mating surfaces are in contact with one another along a junction that extends along a plane that passes through a central axis of the sensing assembly along a 45 degree angle.

* * * * *